United States Patent
Nishikawa et al.

(10) Patent No.: US 7,145,687 B2
(45) Date of Patent: Dec. 5, 2006

(54) METHOD AND APPARATUS FOR PROCESSING INFORMATION

(75) Inventors: Satoshi Nishikawa, Kanagawa (JP); Junichiro Kizaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 10/238,740

(22) Filed: Sep. 11, 2002

(65) Prior Publication Data

US 2003/0053113 A1    Mar. 20, 2003

(30) Foreign Application Priority Data

Sep. 14, 2001    (JP) .............................. 2001-280604

(51) Int. Cl.
*B41F 33/06*    (2006.01)

(52) U.S. Cl. ................... 358/1.18; 358/1.15; 358/1.16; 358/1.17

(58) Field of Classification Search ............... 358/1.18, 358/1.15, 1.16, 1.17, 1.11
See application file for complete search history.

(56) References Cited

U.S. PATENT DOCUMENTS

| | | | |
|---|---|---|---|
| 5,124,731 A * | 6/1992 | Knodt et al. ................. | 347/129 |
| 6,388,765 B1 * | 5/2002 | Nagano et al. ............. | 358/1.18 |
| 6,886,028 B1 * | 4/2005 | Matsuyama et al. ........ | 709/203 |

* cited by examiner

*Primary Examiner*—Mark Zimmerman
*Assistant Examiner*—Jacob P. Rohwer
(74) *Attorney, Agent, or Firm*—Fitzpatrick, Cella, Harper & Scinto

(57) ABSTRACT

When a document is printed, a designated printing range of the document is accepted, and a decision as to whether printing processing can be performed in the designated printing range is made on the basis of the designated printing range and print settings made for the document, and a printing range in which printing processing is permitted is determined according to a result of this decision.

16 Claims, 25 Drawing Sheets

FIG. 9

BOOK DETAIL SETTING

| PAGE SETTING | FINISH | EDIT | FEED |

901 — PRINTING METHOD:
○ ONE-SIDED PRINTING
○ DOUBLE-SIDED PRINTING
◉ BOOKBINDING PRINTING

902 — OPENING METHOD: [ LEFT OPENING ▼ ]

☑ MAKING SADDLE STITCH  ☑ USING TRIMMER
☐ SETTING BOOKBINDING STITCH MARGIN [5] mm (0~30)
☑ BRINGING ORIGINAL CLOSER TO STITCH POSITION

903 — ADJUSTMENT OF ORIGINAL:
◉ REDUCING ACCORDING TO PRINT AREA
○ MOVING ACCORDING TO BINDING WIDTH

904 — BOOKBINDING PRINTING METHOD:
◉ PRINTING ALL PAGES IN ONCE SEQUENCE
○ PRINTING ON SHEETS GROUPED INTO BATCHES [15] PAGES EACH (0 TO 15 PAGES)

905 — CHAPTER BOUNDARIES: [ CHANGE SHEET ▼ ]

[ OK ]  [ CANCEL ]  [ RESET TO STANDARD ]
[ APPLY(A) ]  [ HELP ]

FIG. 10

PRINT SETTING
|-- PRINT SETTING VALID THROUGHOUT DOCUMENT
|-- PRINT SETTING VALID WITH RESPECT TO TIED GROUPS OF SHEETS
    |-- PRINT SETTING VALID WITH RESPECT TO SHEETS
    |-- PRINT SETTING VALID WITH RESPECT TO SHEETS
    |-- PRINT SETTING VALID WITH RESPECT TO SHEETS
|-- PRINT SETTING VALID WITH RESPECT TO TIED GROUPS OF SHEETS
    |-- PRINT SETTING VALID WITH RESPECT TO SHEETS
    |-- PRINT SETTING VALID WITH RESPECT TO SHEETS
    |-- PRINT SETTING VALID WITH RESPECT TO SHEETS

FIG. 16A

| NO | ATTRIBUTE INFORMATION | | REMARKS |
|---|---|---|---|
| 1 | PRINTING METHOD | ONE-SIDED / DOUBLE-SIDED / BOOKBINDING METHOD | |
| 2 | SHEET SIZE | ORIGINAL SIZE / FIXED SIZE | • IF "A4 + A3," "B4 + B3," OR "LETTER + LEISURE (11 × 17)" IS DESIGNATED, Z-FOLD IS DESIGNATED<br>• IF BOOKBINDING PRINTING OR N-up PRINTING IS DESIGNATED, FIRST CHAPTER / FIRST PAGE ORIGINAL SIZE IS AUTOMATICALLY SELECTED |
| 3 | SHEET ORIENTATION | VERTICAL / HORIZONTAL | • SELECTABLE WITH RESPECT TO FIXED SIZES ONLY |
| 4 | STITCH MARGIN / STITCH DIRECTION | | • SHIFT / ENLARGEMENT / REDUCTION DESIGNABLE |
| 5 | N-up PRINTING | NUMBER OF PAGES / LAYOUT ORDER / BOUNDARIES / LAYOUT POSITIONS / ... | • 9 LAYOUT POSITION PATTERNS<br>• 1:1 MAGNIFICATION DESIGNABLE |
| 6 | ENLARGEMENT / REDUCTION | ON / OFF | IF FIXED SIZE IS SELECTED AS SHEET SIZE, OR IF N-up PRINTING IS SELECTED, ON IS AUTOMATICALLY DESIGNATED. OFF IS DESIGNABLE. |
| 7 | WATERMARK | | • SEPARATELY DESIGNABLE FOR LOGICAL PAGES OR PHYSICAL PAGES<br>• TARGET THROUGH ALL CHAPTERS / ALL PAGES |

FIG. 16B

| | | |
|---|---|---|
| 8 | HEADER/FOOTER | • SEPARATELY DESIGNABLE FOR LOGICAL PAGES OR PHYSICAL PAGES<br>• TARGET THROUGH ALL CHAPTERS/ALL PAGES |
| 9 | DISCHARGE METHOD | STAPLING/PUNCH HOLES | • STAPLING/PUNCHING USABLE IN ONE-SIDED/DOUBLE-SIDED PRINTING ONLY<br>• STAPLING IN ONE PLACE/TWO PLACES |
| 10 | BOOKBINDING DETAILS | OPENING DIRECTION/SADDLE STITCH/ENLARGEMENT/REDUCTION/STITCH MARGIN/SEPARATE VOLUME DESIGNATION/.. | • IN THE CASE OF BOOKBINDING PRINTING ONLY |
| 11 | FRONT/BACK COVER | | • DESIGNATION OF PRINTING ON 1/2 FRONT COVER, 1/2 BACK COVER<br>• DESIGNATION OF FEED PORT (INCLUDING INSERTER) |
| 12 | INDEX PAPER | | • PRINTING OF SEQUENCE OF CHARACTERS ON INDEX SECTION, ANNOTATION ON INDEX PAPER DESIGNABLE<br>• BOOKBINDING PRINTING NON-DESIGNABLE |
| 13 | COMBINED SHEET | | • DESIGNATION OF FEED PORT (INCLUDING INSERTER)<br>• ORIGINAL DATA PRINTABLE ON INSERTED SHEET<br>• BOOKBINDING PRINTING NON-DESIGNABLE |
| 14 | CHAPTER BOUNDARIES | "NO BOUNDARY"/"PAGE CHANGE"/"SHEET CHANGE" | • "SHEET CHANGE" ALONE IF INDEX SHEET OR COMBINED SHEET IS DESIGNATED<br>• "SHEET CHANGE" IN THE CASE OF ONE-SIDED PRINTING |

FIG. 17

| NO | ATTRIBUTE INFORMATION | | REMARKS |
|---|---|---|---|
| 1 | SHEET SIZE | ORIGINAL SIZE / FIXED SIZE | • "SHEET CHANGE" IS AUTOMATICALLY DESIGNATED IF FIXED SIZE IS SELECTED<br>• ONLY DESIGNATED SHEETS ARE CHANGEABLE IF A PLURALITY OF SHEETS ARE SELECTED FOR BOOK, AND SHEET SIZE CAN ALSO BE CHANGED EVEN IN THE CASE OF DESIGNATION ACCORDING TO BOOK |
| 2 | SHEET ORIENTATION | VERTICAL / HORIZONTAL | • SELECTABLE WITH RESPECT TO FIXED SIZES ONLY |
| 3 | DESIGNATION OF N-up PRINTING | NUMBER OF PAGES / LAYOUT ORDER / BOUNDARIES / LAYOUT POSITIONS /.. | • 9 LAYOUT POSITION PATTERNS<br>• 1:1 MAGNIFICATION DESIGNABLE |
| 4 | ENLARGEMENT / REDUCTION | ON / OFF | • IF FIXED SIZE IS SELECTED AS SHEET SIZE, OR IF N-up PRINTING IS SELECTED, ON IS AUTOMATICALLY DESIGNATED. OFF IS DESIGNABLE. |
| 5 | WATERMARK | INDICATION / NON-INDICATION | • DESIGNATION OF INDICATION / NON-INDICATION OF ALL WATERMARKS DESIGNATED IN BOOK |
| 6 | HEADER / FOOTER | INDICATION / NON-INDICATION | • DESIGNATION OF INDICATION / NON-INDICATION OF ALL HEADERS / FOOTERS DESIGNATED IN BOOK |
| 7 | DISCHARGE METHOD | STAPLING | • OFF IS POSSIBLE WHEN STAPLING IS DESIGNATED IN BOOK. DEFAULT IS ON. |

FIG. 18

| NO | ATTRIBUTE INFORMATION | | REMARKS |
|---|---|---|---|
| 1 | DESIGNATION OF PAGE ROTATION | | • 0 / 90 / 180 / 270 DEGREES DESIGNABLE |
| 2 | WATERMARK | INDICATION / NON-INDICATION | • DESIGNATION OF INDICATION / NON-INDICATION OF ALL WATERMARKS DESIGNATED IN BOOK |
| 3 | HEADER / FOOTER | INDICATION / NON-INDICATION | • DESIGNATION OF INDICATION/NON-INDICATION OF ALL HEADERS / FOOTERS DESIGNATED IN BOOK |
| 4 | ZOOM | 50% - 200% | • DESIGNATION OF RELATIVE MAGNIFICATION WITH RESPECT TO SIZE FITTED TO VIRTUAL LOGICAL PAGE AREA SET TO 100% |
| 5 | LAYOUT POSITION | | • NINE FIXED PATERNS AND ARBITRARY POSITION ARE DESIGNATED |
| 6 | ANNOTATION | | |
| 7 | VARIABLE ITEMS | | |
| 8 | PAGE DIVISION | | |

METHOD AND APPARATUS FOR PROCESSING INFORMATION

FIELD OF THE INVENTION

The present invention relates to an information processing apparatus which forms printing data to be printed by a printing machine from document data produced by a document processing program for example, and to a method of processing information in the information processing apparatus.

BACKGROUND OF THE INVENTION

Different sorts of data such as characters, tables and images are defined in different structures and edited by different editing operations. Therefore various application programs according to sorts of data are provided. Users selectively use applications in accordance with the kinds of data: a character processing program for editing characters, a spreadsheet program for editing a table, an image editing program for editing an image, etc.

Thus, users ordinarily use different application programs for various sorts of data. However, documents each constituted by a plurality of sorts of data, e.g., characters and a table, or characters and images are more commonly produced by users in comparison with documents constituted by only one sort of data, e.g., characters alone, tabulated data alone, or images alone. When a user produces a target document including a plurality of sorts of data, it is necessary for the user to use the printing function of each of the necessary kinds of application to print related data, and to combine and order pieces of printed matter according to his/her need.

A program called Office sweet and formed of various applications forming one integrated application provides the function of forming one document by combining groups of data produced by the different applications. By using such an integrated application, a user can combine groups of data produced by some applications into one target document by a specific application contained in the integrated application.

Some of systems formed by an information processor such as a personal computer connected to a printer, etc., also include a spool module which temporarily stores data in a spool file by forming the data in a data format (what is called, intermediate code) different from a final format, i.e., the format of printing data sent to a printer before the data is formed as printing data by a printer driver on the information processor, a despool module which reprocesses the data temporarily stored in the intermediate code format into printing data to be finally sent to the printer, and a core driver module which generates printer control commands. Each of the spool module, the despool module, and the core driver module is provided in a state of being incorporated in the printer drier when the printer driver is installed in the information processor. The printer driver and these modules are recognized as one printer driver from each application.

However, in a case where a user produces one target document by combining pieces of printed matter provided by using various applications, numbering of the pages of the document for example requires a process in which the necessary data is first printed out from a printer, the pieces of printed matter printed out are combined into one document, and the user determines page numbers to be assigned to the pages. The page numbers must be set manually by the user. Even if one of the application has a page numbering function, discontinuous document portions may be produced by the application. In such a case, the user must also designate page numbers on the portions after each discontinuity. Also, it is not possible to number the pages of a plurality of document files produced by different kinds of application by treating the plurality of files as one document. In a case where the pages of a target document is rearranged, it is necessary to renumber the pages according to the arrangement. Even in a case where the format is simply changed without changing data contents, e.g., a case where a plurality of original pages are combined into one page of printed matter (referred to as "physical page" or "print page") or in case where the printing mode is changed from one-sided printing to double-sided printing, reediting and reprinting by the corresponding application is required.

Thus, different applications are required to respectively manage different sorts of data and a user using applications must provide manual interfacing between the applications by him/herself. This means that much effort is required of users to use applications and the productivity of document production is low. Also, there is an increased possibility of errors because of the existence of manual interfacing increasing a number of manual operations.

On the other hand, in a case where a target document is produced by using an integrated application, various sorts of data can be arranged in the data state without being printed out. Therefore, document production using an integrated application does not require so much effort as that in the case of producing a target document by combining pieces of printed matter.

In the case of use of an integrated application, however, applications for editing and producing various sorts of data are limited to those contained in the integrated application. It is not always possible for a user to use applications according to his/her need. Also, a target document formed by an integrated application is one document file and is managed on a file-by-file basis with respect editing, outputting, etc. Therefore there are many restrictions relating to application functions on a format setting of part of such a document. For example, it is necessary to repeat operations for changing the format setting and reprinting in correspondence with format changing points. Thus, a method of editing and producing a document by using an integrated application also has the drawbacks of requiring much effort and having low productivity, as does the above-described method of using independent applications.

Further, some of systems formed by an information processor such as a personal computer connected to a printer, etc., also include a spooler which temporarily stores data in a data format (what is called, intermediate code) different from that for printing data finally sent to a printer, a despooler which reprocesses the data temporarily stored in the intermediate code format into printing data to be finally sent to the printer, and a means for generating printer control commands. Also, a mechanism for designating a printing range in data temporarily stored and enabling the data in the designated range to be printed exists as a system commonly used. However, there is a problem with this system and mechanism that a printing effect designed before saving of printing data cannot be obtained according to the design if a printing range is designated at the time of printing.

SUMMARY OF THE INVENTION

The present invention has been proposed to solve the conventional problems, and has as its object to provide an information processing apparatus and method used in a document processing system to enable a user to produce and edit a document by combining groups of data formed by application programs selected according to user's need, and to improve the document editing productivity by improving the operability of the system.

The present invention also has as its another object to enable such printing control in the information processing apparatus and method applied to the document processing system that, in a case where a printing range is designated at the time of printing with respect to output contents prescribed according to an intention in printing control before saving of printing data to the spooler, printing control reflecting the desired printing contents can be performed.

To attain the above-described objects, according to one aspect of the present invention, there is provided an information processing apparatus which produces printing data to be printed by a printer, the apparatus having acceptance means for accepting a printing range of a document designated when printing of the document is performed, decision means for making a decision about permission of printing processing in the designated printing range on the basis of the designated printing range and print settings made for the document, and printing range determination means for determining a printing range in which printing processing is permitted according to the result of decision made by the decision means.

Preferably, the above-described information processing apparatus also has data control means for changing and controlling a print setting made for the document when printing of the document is performed, and save control means for saving and controlling the changed data as an effective print setting on the basis of a saving instruction from the data control means. The printing range determination means produces printing data in the printing range on the basis of the print setting saved by the save control means or the unsaved print setting changed and controlled by the data control means.

Preferably, in the above-described information processing apparatus, the data control means changes with respect to a print unit a print setting made for the document, and/or adds control data for controlling printing with respect to the print unit.

Preferably, in the above-described information processing apparatus, the printing range determination means produces printing data with respect to the print unit on the basis of print designation and according to the print settings.

Preferably, in the above-described information processing apparatus, if a print setting for designating recovery printing is made by the data control means, the save control means updates and stores the print setting according to a save instruction from the data control means.

Preferably, in the above-described information processing apparatus, if a print setting made by the data control means is a setting for recovery printing, the printing range determination means determines a printing range from which recovery printing is started, and produces printing data corresponding to the printing range.

Preferably, in the above-described information processing apparatus, if a print setting made by the data control means is a setting for recovery printing, the printing range determination means makes a determination as to whether a range in halfway printing is not permitted is designated in the print setting, and, if a print unit from which recovery printing is started is included in the range, determines a start of recovery printing at the first print unit in the range in which halfway printing is not permitted.

Preferably, in the above-described information processing apparatus, the print unit is data issued with respect to printing of the document, and this data has a data structure such that a minimum unit corresponds to an original page.

According to another aspect of the present invention, there is provided an information processing method in which printing data to be printed by a printer is produced, the method including an acceptance step of accepting a printing range of a document designated when printing of the document is performed, a decision step of making a decision about permission of printing processing in the designated printing range on the basis of the designated printing range and print settings made for the document, and a printing range determination step of determining a printing range in which printing processing is permitted according to the result of decision made in the decision step.

Preferably, the above-described information processing method further includes a data control step of changing and controlling a print setting made for the document when printing of the document is performed, and a save control step of saving and controlling changed data as an effective print setting on the basis of a saving instruction issued in the data control step. The printing range determination step includes producing printing data in the printing range on the basis of the print setting saved into a memory by processing in the save control step or the unsaved print setting changed and controlled in the data control step.

Preferably, in the above-described the information processing method, the data control step includes changing with respect to a print unit a print setting made for the document, and/or adding control data for controlling printing with respect to the print unit.

Preferably, in the above-described information processing method, the printing range determination step includes producing printing data with respect to the print unit on the basis of print designation and according to the print settings.

Preferably, in the above-described information processing method, if a print setting for designating recovery printing is made in the data control step, the save control step includes updating and storing into a memory the print setting according to a save instruction issued in the data control step.

Preferably, in the above-described information processing method, if a print setting made in the data control step is a setting for recovery printing, the printing range determination step includes determining a printing range from which recovery printing is started, and producing printing data corresponding to the printing range.

Preferably, in the above-described information processing method, if a print setting made in the data control step is a setting for recovery printing, the printing range determination step includes making a determination as to whether a range in halfway printing is not permitted is designated in the print setting, and, if a print unit from which recovery printing is started is included in the range, determining a start of recovery printing at the first print unit in the range in which halfway printing is not permitted.

Preferably, in the above-described information processing method, the print unit is data issued with respect to printing of the document, and this data has a data structure such that a minimum unit corresponds to an original page.

According still another aspect of the present invention, there is provided a program for enabling a computer to execute an information processing method in which printing data to be printed by a printer is produced, the program making the computer execute an acceptance module for accepting a printing range of a document designated when printing of the document is performed, a decision module for making a decision about permission of printing processing in the designated printing range on the basis of the designated printing range and print settings made for the document, and a printing range determination module for determining a printing range in which printing processing is permitted according to the result of decision made in the decision module.

According to a further aspect of the present invention, there is provided a storage medium on which there is stored a program for enabling a computer to execute an information processing method in which printing data to be printed by a printer is produced, the storage medium including an acceptance module for accepting a printing range of a document designated when printing of the document is performed, a decision module for making a decision about permission of printing processing in the designated printing range on the basis of the designated printing range and print settings made for the document, and a printing range determination module for determining a printing range in which printing processing is permitted according to the result of decision made in the decision module.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a diagram showing an example of another user interface of the printing control application;

FIG. 10 is a diagram schematically showing a despool table;

FIGS. 16A and 16B are diagrams showing a list of book attributes;

FIG. 17 is a diagram showing chapter attributes;

FIG. 18 is a diagram showing page attributes;

DETAILED DESCRIPTION OF THE PREFERRED EMBODIMENTS

Preferred embodiments of the present invention will now be described in detail in accordance with the accompanying drawings.

<Outline of System>

A document processing system in which the information processing system of the present invention can be suitably implemented will be outlined with reference to FIGS. 13 to 24. In this document processing system, a data file produced by an ordinary application is converted into an electronic original file by an electronic original writer. A bookbinding application provides a function for editing such an electronic original file. Details of the document processing system will be described below.

<Configuration and Operation of System>

Figure 13:
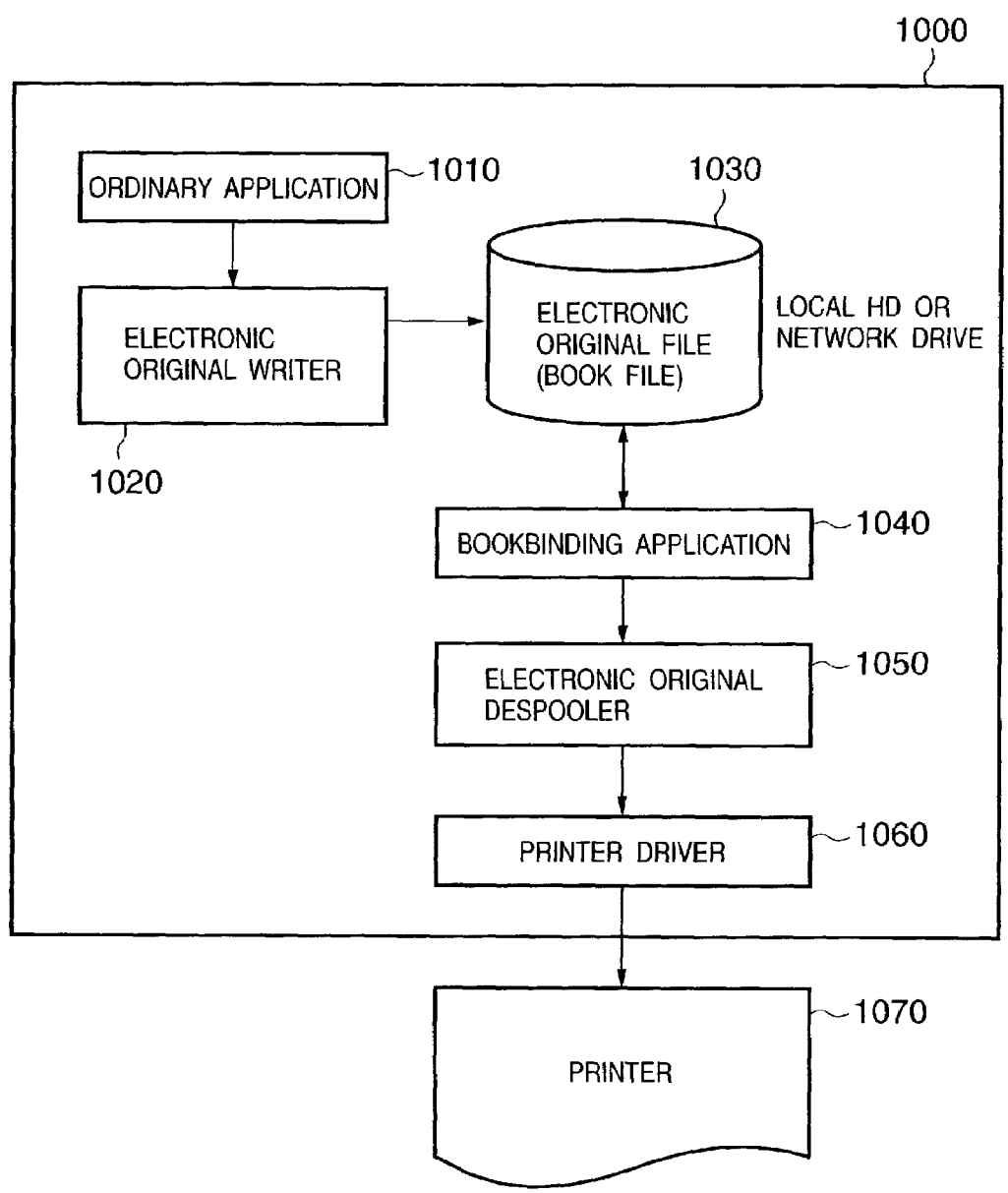
FIG. 13 is a block diagram of a standalone type of a document processing system.

FIG. 13 is a diagram showing the software configuration of the document processing system representing an embodiment of the present invention. The document processing system can be realized as a digital computer 1000 in the preferred embodiments of the image forming processing apparatus of the present invention. Ordinary applications 1010 are application programs which provide functions for word processing, spreadsheet processing, photo-retouching, drawing or painting, presentation, text editing, etc., and have printing functions compatible with an operating system (OS). Each of these applications uses a predetermined interface (generally called a graphic device interface (GDI)) provided by the OS when it prints application data such as document data or image data produced. That is, each application 1010 transmits output commands (called a GDI function) in a predetermined format depending on the OS to an output module of the OS providing the above-described interface to print application data that it has produced. The output module receiving the output commands converts the output commands into such a format that an output device such as a printer can process the commands, and outputs converted drawing commands (called a "DDI function"). Since the format in which data is processible by the output device varies depending on the kind of device, makers, models, etc., a device driver is provided for each of devices usable in the system. The OS converts commands by using the device driver to generate printing data, and ties up them by a job language (JL) to generate a printing job. If a Windows from Microsoft Corporation is used as the OS, a module called GDI corresponds to the above-mentioned output module.

An electronic original writer 1020 is a software module provided as one of the above-mentioned device drivers to realize this document processing system. However, the electronic original writer 1020 is not intended for a particular output device. The electronic original writer 1020 converts output commands into a format such that the output commands can be processed by a bookbinding application 1040 or a printer driver 1060 described below. The format after conversion by this electronic original writer 1020 (hereinafter referred to as "electronic original format") may be freely selected. Any format may suffice if originals can be expressed in a finely-specified style on a page-by-page basis. The Portable Document Format (PDF) or the Scalable Vector Graphics (SVG) format developed by Abobe Systems Incorporated may be adopted as the electronic original format out of substantially standard formats. To enable each application 1010 to use the electronic original writer 1020, printing is executed after designating the electronic original writer 1020 as a device driver used for outputting. However, an electronic original file made by the electronic original writer 1020 is not completely formatted as the electronic original file when being made. The bookbinding application 1040 designates the electronic original writer 1020 as a device driver, and conversion of application data into an electronic original file is executed under the control of the bookbinding application 1040. An incomplete electronic original file newly produced by the electronic original writer 1020 is completed by the bookbinding application 1040 as an electronic original file in the format described below. To make this point clear, files made by the electronic original writer 1020 are called electronic original files while electronic original files structured by the bookbinding application are called book files. When there is no particular need for distinction between these kinds of files, each of the document files produced by applications, electronic original files and book files is called a document file (or document data).

As described above, the electronic original writer 1020 is designated as a device driver, and the ordinary application 1010 makes the electronic original writer 1020 print its data. The application data is thereby converted into the electronic original format using a unit page defined by the application 1010 (hereafter referred to as "logic page" or "original page"). The converted data is stored as electronic original file 1030 on a storage medium, e.g., a hard disk. The hard disk may be a local drive provided in the computer for realizing the document processing system of this embodiment, or a drive provided on a network if the document processing system is connected to the network.

The bookbinding application 1040 provides a user with functions for reading an electronic original file or book file 1030 and editing the read file. However, the bookbinding application 1040 provides no function for editing the contents on each page, and provides functions for editing the structures of a chapter and a book in which each page is formed as a minimum unit, as described below.

When a book file 1030 edited by the bookbinding application 1040 is printed, an electronic original despooler 1050 is activated by the bookbinding application 1040. The electronic original despooler 1050 reads out the designated book file from the hard disk, generates output commands compatible with the above-described output module of the OS, and outputs the output commands to the output module (not shown) to print each page in the format described in the book file. At this time, a driver 1060 of a printer 1070 used as an output device is designated as a device driver. The output module converts the output commands received by using the device driver 1060 of the designated printer 1070 into device commands which can be interpreted and executed by the printer 1070. The device commands are then transmitted to the printer 1070 and images according to the commands are printed by the printer 1070.

Figure 14:
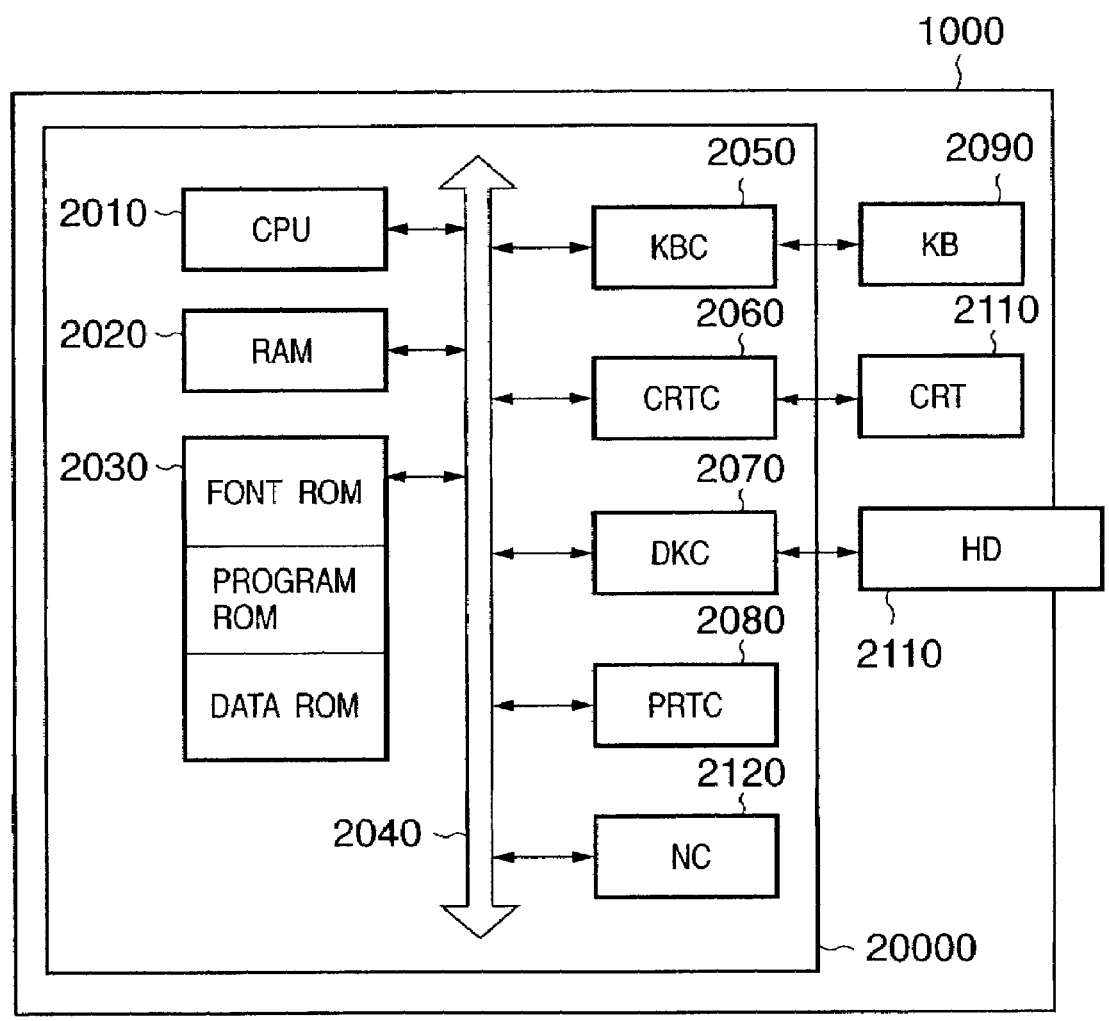
FIG. 14 is a block diagram of a computer realizing the document processing system.

FIG. 14 is a hardware block diagram of the computer 1000. Referring to FIG. 14, a central processing unit (CPU) 2010 executes programs including the OS, an ordinary application and the bookbinding application stored in a read-only memory (ROM) for storage of programs in a ROM 2030 or loaded from a hard disk 2110 into a random-access memory (RAM) 2020 to realize the software configuration shown in FIG. 13 and a procedure described below. The RAM 2020 functions as a main memory, a work area or the like for the CPU 2010. A keyboard controller (KBC) 2050 controls key inputs from a keyboard 2090 and a pointing device (not shown). A cathode ray tube (CRT) controller (CRTC) 2060 controls display on a CRT display 2100. A disk controller (DKC) 2070 controls access to the hard disk (HD) 2110 on which a boot program, various applications, font data, user files, edited files described below, etc., are stored, or to a floppy disk (FD) or the like. A printer controller (PRTC) 2080 controls exchange of signals between the computer and the connected printer 1070. A network controller (NC) 2120 is connected to a network and controls processing for control of communication with other devices connected to the network.

<Format of Electronic Original Data>

The data format of book files will be described before a detailed description of editing application 1040. A book file has a three-layer structure modeled on that of paper medium documents. The upper layer is called "book" modeled on a book, and contains definitions of attributes of the entire book. The middle layer corresponds to chapters in a book and is referred to as "chapter." Attributes can be defined for each chapter. The lower layer is a "page" corresponding to pages defined in an application program. Attributes can also be defined for each page. One book may contain a plurality of chapters, and one chapter may contain a plurality of pages.

Figure 15A:
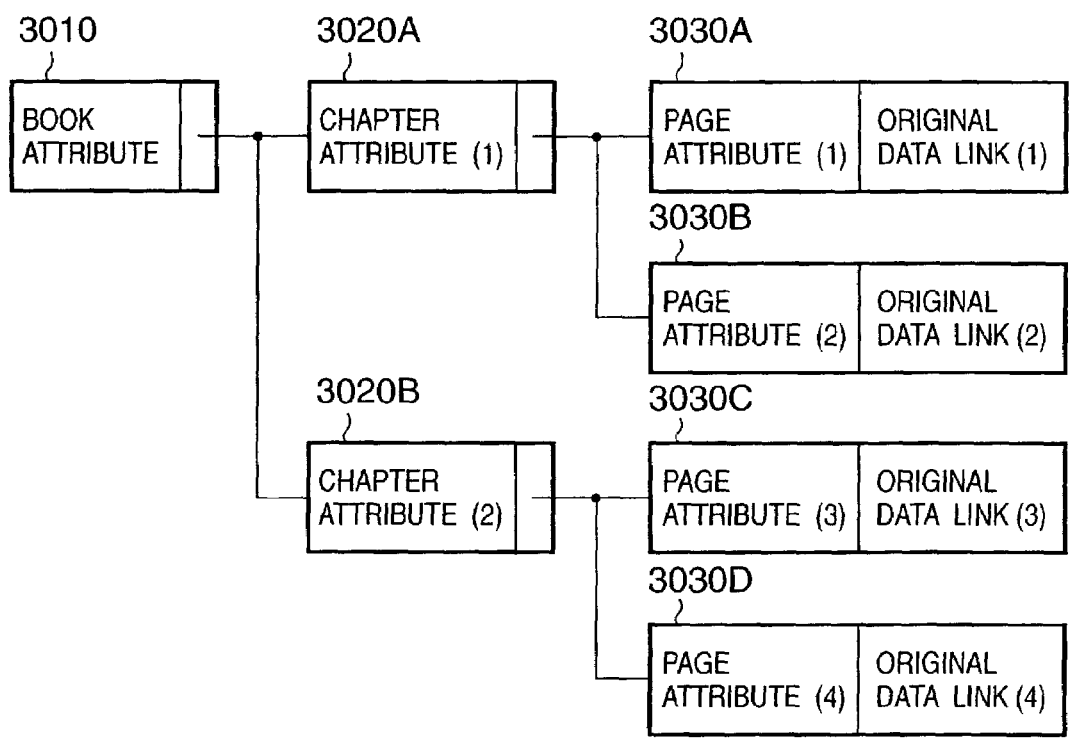
FIGS. 15A and 15B are diagrams showing an example of a book file structure.

FIG. 15A is a diagram schematically showing an example of the book file format. In a book file in this example, a book, chapters and pages are indicated by corresponding nodes. One book file contains one book. Since "book" is a concept for defining a structure as a book, a book includes as its substantial contents defined attribute values and links to lower layers. A page has as its substantial contents page data which is output by an application program. Accordingly, a page includes, as well as its attribute values, the original page substance (original page data) and a link to original page data. A printing page at the time of outputting onto a paper medium or the like may contain a plurality of original pages. Such a structure is indicated not by links but as attributes in the book, chapter and page layers.

Referring to FIG. 15A, book attributes are defined in a book 3010, and two chapters 3020A and 3020B have links to the book 3010. These links indicate that the chapters 3020A and 3020B are contained in the book 3010. Pages 3030A and 3030B have links to the chapter 3020A, which indicate that the pages 3030A and 3030B are contained in the chapter 3020A. Attribute values are defined in each of the pages 3030A and 3030B and links to original data groups (1) and (2) corresponding to the substances of the pages are contained. These links designate data (1) and (2) of original page data 3040 shown in FIG. 15B, indicating that the substances of pages 3030A and 3030B are original data groups (1) and (2).

FIG. 16A and FIG. 16B are lists of book attributes. Of attribute items redundantly definable in two or more of the layers, the attribute value in the lower layer is used with priority. Accordingly, with respect to an item contained only as a book attribute, the value defined as the book attribute is valid throughout the book. On the other hand, an item with a duplicated definition in at least one of the lower layers is given such a meaning as to be treated as a default value without any corresponding definition in the lower layers. Each listed item does not correspond to an actual one item. It comprises a plurality of items related to each other.

FIG. 17 is a list of chapter attributes, and FIG. 18 is a list of page attributes. The relationship between chapter attributes and page attributes is the same as that relationship between book attributes and attributes in the lower layers.

There are six items provided as book attributes exclusively: "printing method," "bookbinding details," "front/back cover," "index sheet," "combined sheet" and "chapter boundaries." These are defined throughout a book. As printing method attributes, three values for one-sided printing, double-sided printing, bookbinding printing can be designated. Bookbinding printing is a method of printing in such a format that batches of a number of print sheets designated in an additional procedure are folded into two and are bound together to form a book. As bookbinding detail attributes, the spreading direction, the number of sheets in each batch, etc., can be designated if bookbinding printing has been designated.

Setting of front/back cover attributes include information about designation of addition of paper sheets for front and back covers at the time of printing of electronic original files combined to form a book, and information about designation of the contents of prints on the added sheets. Index sheet attributes include information about designation of insertion of index sheets with tabs separately provided in the printing machine (in correspondence with chapter boundaries), and information about designation of the contents of prints on the index (tab) portion. These attributes are valid in the case where an inserter having the function of inserting sheets provided separately from printing sheets at desired positions is provided in the printing machine employed, or in the case where a plurality of sheet cassettes can be used. The same can also be said with respect to combined sheet attributes.

Combined sheet attributes include information about designation of insertion of sheets supplied from an inserter or a sheet cassette in correspondence with chapter boundaries, and information about designation of a source from which sheets are supplied in the case of insertion of combined sheets.

Chapter boundary attributes include information about designation of use of a new sheet at each chapter boundary, use of a new print page, or no particular operation. Use of a new sheet and use of a new print page come to the same thing at the time of one-sided printing. At the time of double-sided printing, printing of portions of two consecutive chapters on one sheet is prevented if "use new sheet" is designated. However, when "use new print page" is designated, there is a possibility of portions of two consecutive chapters being printed on the front and back surfaces of one sheet.

There are no items provided as chapter attributes exclusively. All the chapter attributes are duplicated in the book attributes. Therefore, if there is a value defined as one of the chapter attributes and a value defined as the corresponding book attribute differ from each other, the value defined as the chapter attribute is used with priority. There are five items which are common only to the book attributes and the chapter attributes: "sheet size," "sheet orientation," "N-up print designation," "enlargement/reduction," "discharge method." Among them N-up print designation attributes are items for designating the number of original pages contained in one print page. Designable layout patterns are, for example, 1×1, 1×2, 2×2, 3×3, and 4×4. A discharge method attribute is an item for designation as to whether stapling is performed on discharged sheets. The validity of this attribute depends on whether the printing machine employed has a stapling function.

Items provided as page attributes exclusively include, for example, "page rotation designation," "zoom," "layout designation," "annotation," and "page division." A page rotation attribute is an item for designating an angle of rotation when an original page is placed on an print page. A zoom attribute is an item for designating a magnification of an original page. The magnification is designated by setting the size of a virtual logical page area at 100%. The virtual logical page area is an area occupied by one original page when the original page is placed according to a designated Nup attribute, etc. For example, in the case of 1×1, the virtual logical page area corresponds to one print page. In the case of 1×2, the virtual logical page area corresponds to an area formed by reducing the length of each side of one print page to about 70%.

Attributes common to a book, chapters and pages include a watermark attribute and a header/footer attribute. A watermark is an image or a row of characters additionally designated to be printed by being superimposed on data prepared by an application. A header/footer is a kind of watermark printed in a top or a bottom margin on each page. As header/footer items, the page number, date, etc., designable by using a variable are prepared. Contents designable as a watermark attribute and a header/footer attribute in the chapter attributes are the same as contents designable as a watermark attribute and a header/footer attribute in the page attributes. However, contents designable as a watermark attribute and a header/footer attribute in the book attributes are different from those in the chapter attributes or the page attributes. As book attributes, watermark and header contents can be set and a way in which a watermark or a header/footer is printed throughout the book can also be designated. On the other hand, as a chapter or a header attribute, a selection as to whether or not a watermark or a header/footer designated as a book attribute is printed can be designated.

<Book File Production Procedure>

Figure 19:
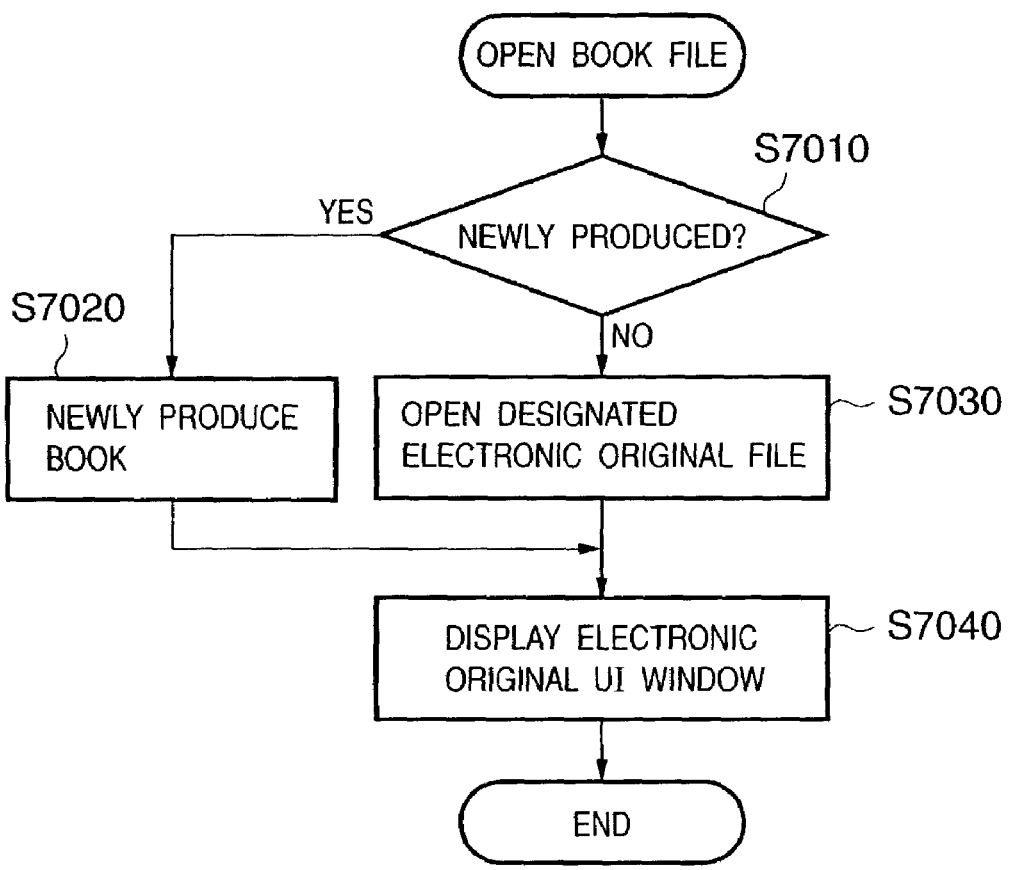
FIG. 19 is a flowchart of a procedure for opening a book file.

A book file has a structure and contents such as those described above. A procedure for producing a book file by bookbinding application 1040 and electronic original writer 1020 will next be described. Production of a book file is realized by steps in a process for editing a book file by bookbinding application 1040. FIG. 19 shows a procedure in which a book file is opened by bookbinding application 1040.

A determination is first made as to whether a book file about to be opened is one newly produced or an existing one (step S7010). In the case of production of a new file, a book file containing no chapter is newly produced (step S7020). The file newly produced is a node of a book comprising only a book node 3010 with no link to a chapter node, if it is represented by part of the example shown in FIG. 15A. A set of book attributes prepared for new-file production are used.

Figure 23:
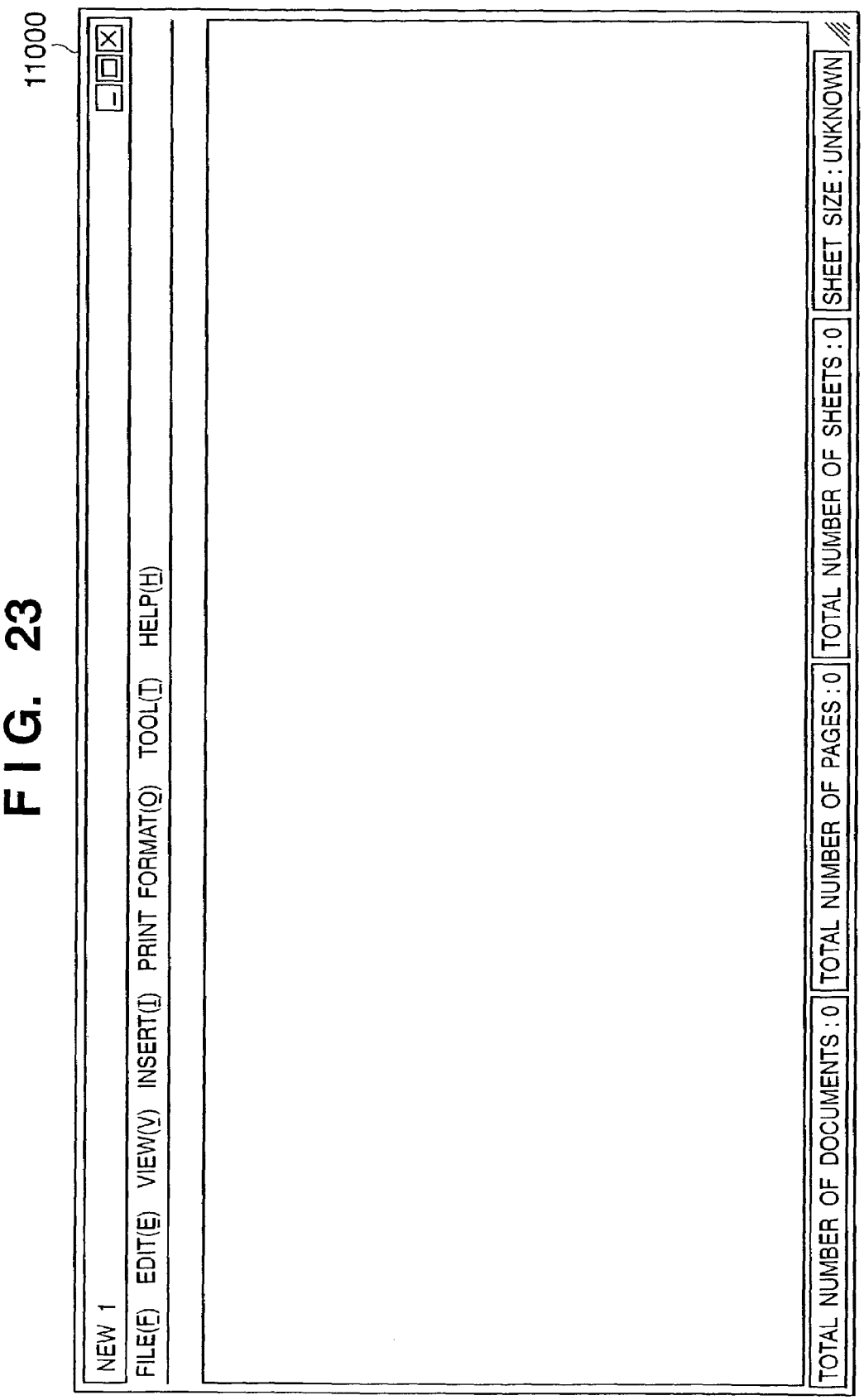
FIG. 23 is a diagram showing an example of a user interface window when a new book file is opened.

A user interface (UI) window for editing a new book file is displayed (step S7040). FIG. 23 shows an example of the UI window when a book file is newly produced. In this case, since the book file has no substantial contents, nothing is displayed in a UI window 11000.

Figure 22:
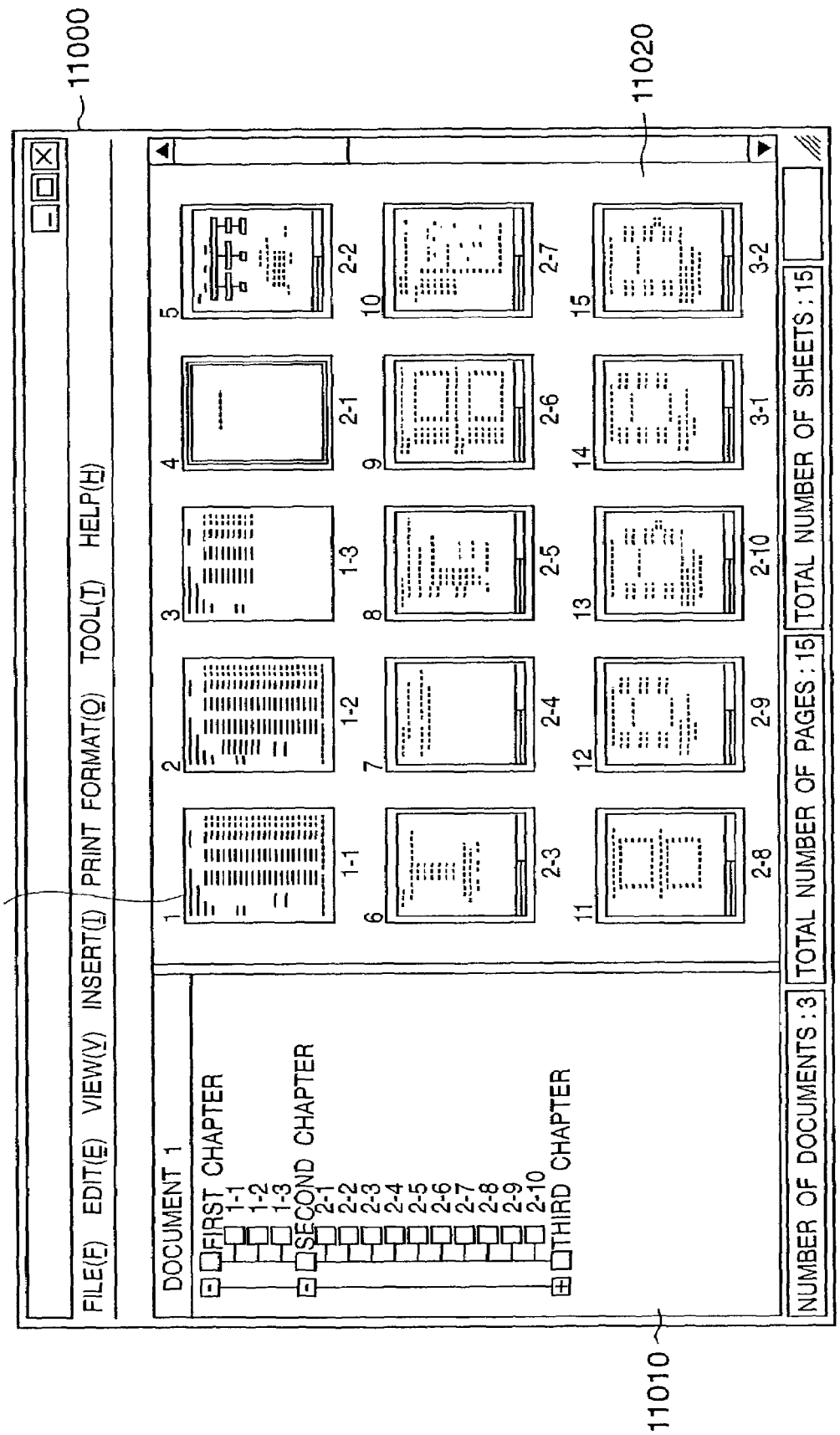
FIG. 22 is a diagram showing an example of a user interface window when an existing book file is opened.

On the other hand, if an existing book file is designated, it is opened (step S7030) and a user interface (UI) window is displayed in accordance with the structure, attributes and contents of the book file. FIG. 22 shows an example of this UI window. A UI window 11000 includes a tree section 11010 in which the structure of the book is shown, and a preview section 11020 in which a printed state is displayed. In the tree section 11010, chapters contained in the book and pages contained in each section are shown in a tree structure such as shown in FIG. 15A. The pages shown in the tree section 11010 are original pages. In the preview section 11020, the contents of print pages are displayed in a scaled-down state. The order in which the pages are displayed reflects the structure of the book.

Figure 20:
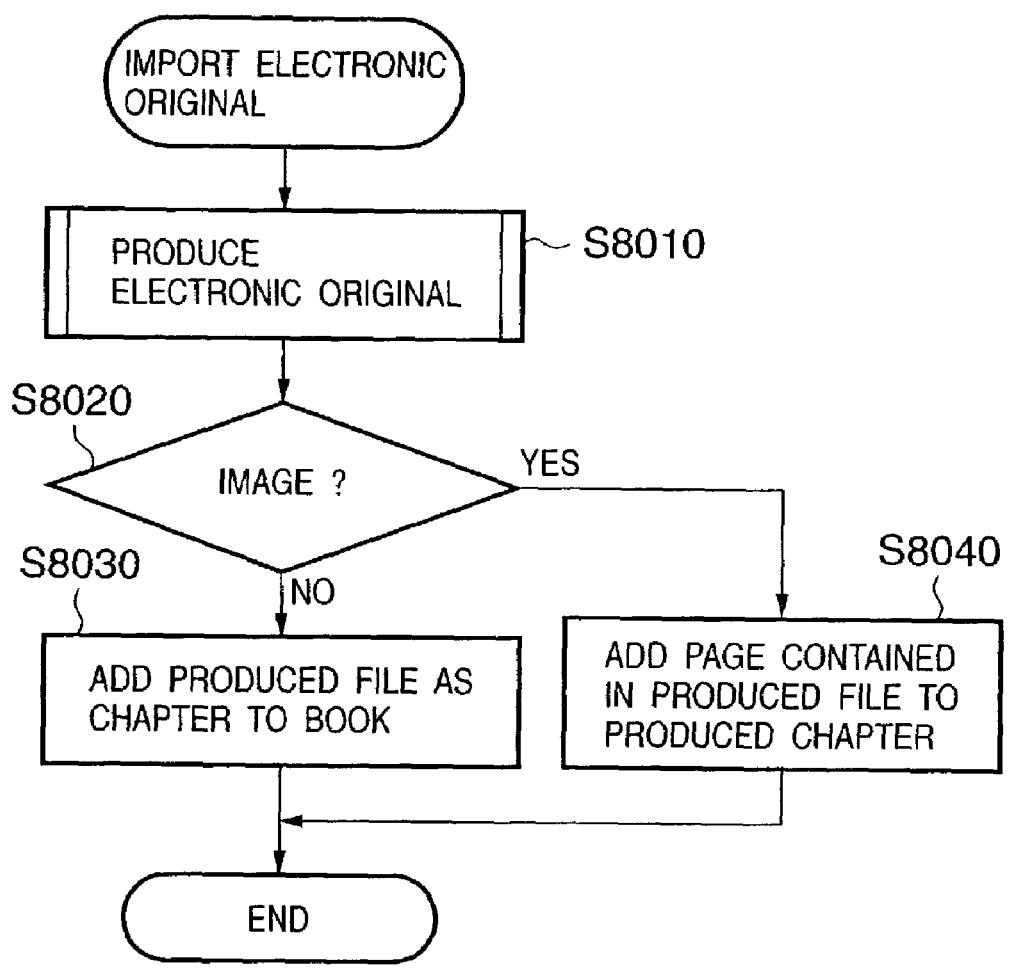
FIG. 20 is a flowchart of a procedure for import of an electronic original file to a book file.

To the opened book file, application data converted into an electronic original file by the electronic original writer can be added as a new chapter. This function will be referred to as an electronic original import function. If a file is added by electronic original import to the book file newly produced by the procedure shown in FIG. 19, the book file is substantiated. This function is started by moving application data by a drug and drop operation in the window shown in FIG. 22. FIG. 20 shows the procedure of electronic original import.

First, the application program used for producing designated application data is started and electronic original writer 1020 is designated as a device driver and made to print out the application data, thereby converting the application data into electronic original data (step S8010). After the completion of conversion, a determination is made as to whether the converted data is image data (step S8020). This determination can be made on the basis of the file extension of the application data in a case where the data is processed under a Window OS. For example, the application data can be determined as bitmap data if the extension is "bmp," as jpeg-compressed image data if the extension is "jpg," and as image data in the tiff format if the extension is "tiff." In the case of such image data, an electronic original file can be produced directly from the image data without starting the application as in S8010, and processing in step S8010 can be skipped.

In the case of data other than image data, the electronic original file produced in step S8010 is added as a new chapter to the book file presently opened (step S8030). If attribute values exist in common as chapter attributes and book attributes, they are copied from the book attributes. The other chapter attributes are set to prepared default values.

In the case of image data, no new chapter is added in principle, and the original pages contained in the electronic original file produced in step S8010 are added to the designated chapter (step S8040). However, in the case where the book file is a newly-produced file, a new chapter is produced and the pages of the electronic original file are added as pages belonging to the new chapter. If attribute values exist in common as page attributes and attributes in the upper layers, those values are given. Attributes defined in the application data and inherited to the electronic original file are also given. For example, an Nup setting, etc., are designated in the application data, the attribute values thereof are inherited. In this manner, a new book file is produced or a new chapter is added.

Figure 15B:
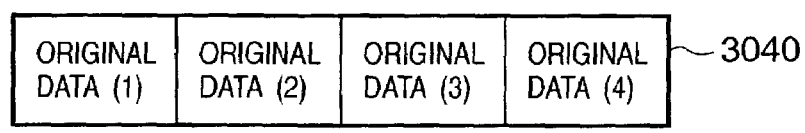
Figure 21:
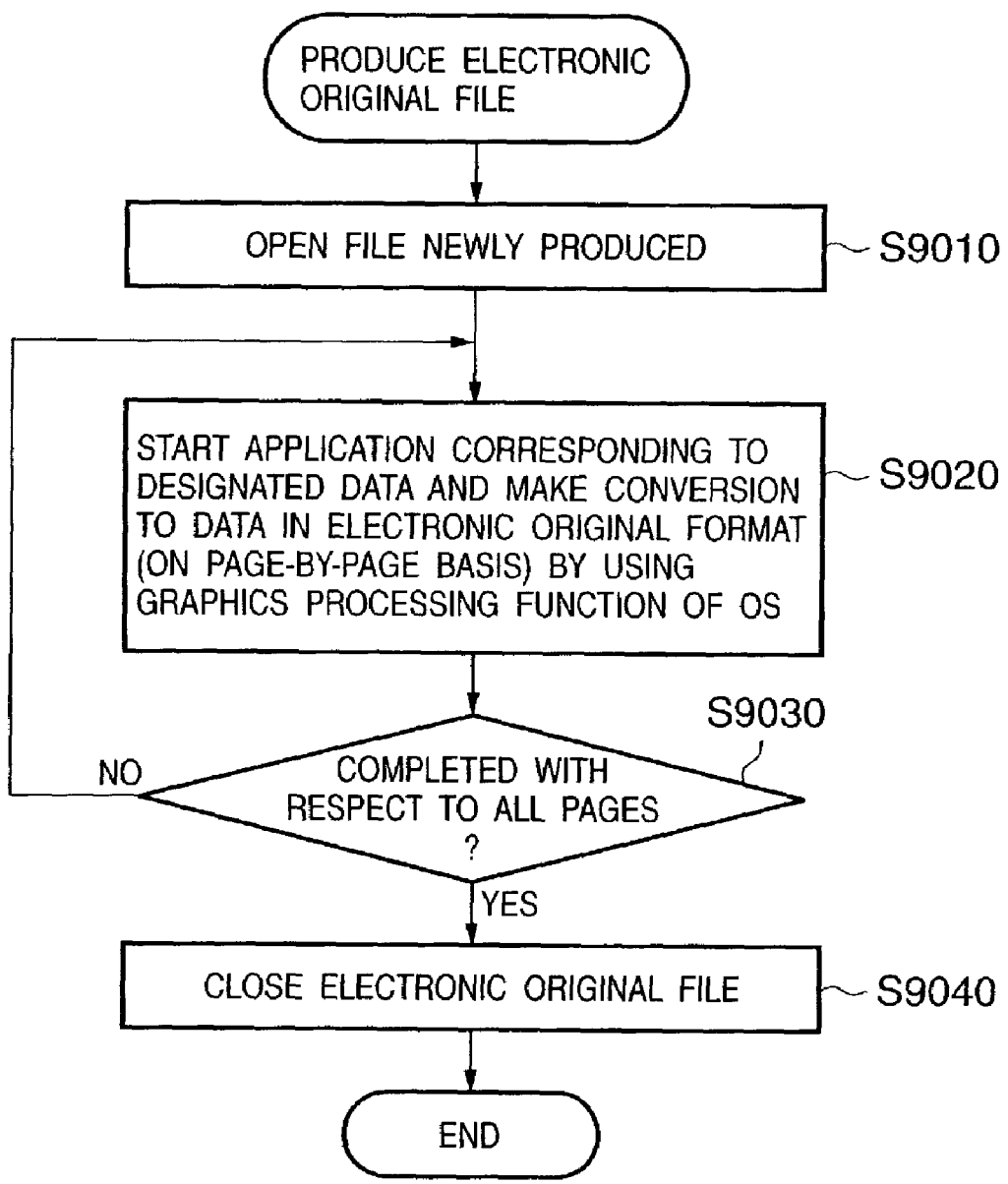
FIG. 21 is a flowchart of a procedure for conversion of application data into an electronic original file.

FIG. 21 is a flowchart showing a procedure for producing an electronic original file by electronic original writer 1020 in step S8010 shown in FIG. 20. First, a new electronic original file is produced and opened (step S9010). The application corresponding to designated application data is started and the electronic original writer is designated as a device driver and made to transmit output commands to the output module of the OS. The output module converts the received output commands into data in the electronic original format by the electronic original writer, and outputs the converted data (step S9020). This data is output to the electronic original file opened in step S9010. A determination is made as to whether conversion has been completed with respect to all the items of the designated data (step S9030). If the conversion has been completed, the electronic original file is closed (step S9040). The electronic original file produced by the electronic original writer 1020 is a file containing the substance of the original page data, as shown in FIG. 15B.

<Editing of Book File>

As described above, a book file can be produced from application data. The chapters and pages of the produced book file can be edited by performing any of operations for:
(1) making a new addition,
(2) deleting,
(3) copying,
(4) cutting,
(5) pasting,
(6) moving,
(7) changing chapter names, etc.,
(8) renumbering the pages,
(9) inserting a cover,
(10) inserting a combined sheet,
(11) inserting an index sheet, and
(12) making a page layout on each original page.

An operation for undoing a completed editing operation and an operation for redoing a canceled operation can also be performed. These editing functions enable, for example, editing operations for integration of a plurality of book files, rearrangement of chapters and pages in each book file, deletion of chapters or pages in each book file, change of the layout on each original page, and insertion of combined sheets and index sheets. If these operations are performed, operation results are reflected in the attributes shown in FIGS. 16 to 18, or in the structure of the book file. For example, an operation for newly adding a blank page is performed, the blank page is inserted at a designated position. This blank page is treated as an original page. If a change is made in the layout on some of the original pages, details of the change are reflected in printing method attributes, N-up printing attributes, front/back cover attributes, index sheet attributes, combined sheet attributes, chapter boundary attributes, etc.

<Output of Book File>

The book file formed and edited as described above is intended to be finally output. When a user selects a file menu from the UI window 11000 of the bookbinding application shown in FIG. 22 and selects "print" from the menu, the designated device prints out the book file. To perform this output, bookbinding application 1040 first forms a job ticket from the book file presently opened and delivers it to electronic original despooler 1050. Electronic original despooler 1050 converts the job ticket into output commands of the OS, e.g., GDI commands of Windows, and outputs the output commands to the output module, e.g., the GDI. The output module generates commands suitable for the output device by the designated printer driver 1060, and transmits the commands to the output device.

The job ticket is data which has such a structure that minimum units of the data correspond to original pages. In the structure of the job ticket, original page layouts on sheets are defined. One job ticket is issued for one job. Accordingly, a document node is placed at the top to define attributes of the entire document, e.g., double-sided printing/one-sided printing. A printing sheet node is placed next which includes an identifier for printing sheets to be used for printing, an attribute for designation of a sheet feed port in the printer, etc. A sheet node defining printing on each of the printing sheets belongs to the printing sheet node. One sheet node corresponds to one printing sheet. One print page (physical page) belongs to one sheet node. In the case of one-sided printing, one physical page belongs to one sheet node. In the case of double-sided printing, two physical pages belong to one sheet node. An original page assigned to each physical page belongs to the physical page. As an attribute of the physical page, the layout of the original page is contained.

Electronic original despooler 1050 converts the above-described job ticket into output commands to the output module.

<Other System Configurations>

The document processing system of the embodiment has been described. While the above-described document processing system is a standalone system, a book file can also be produced and edited by substantially the same arrangement and procedure in a server-client system formed by expanding the above-described system. However, book files and printing processing are managed by a server.

Figure 24:
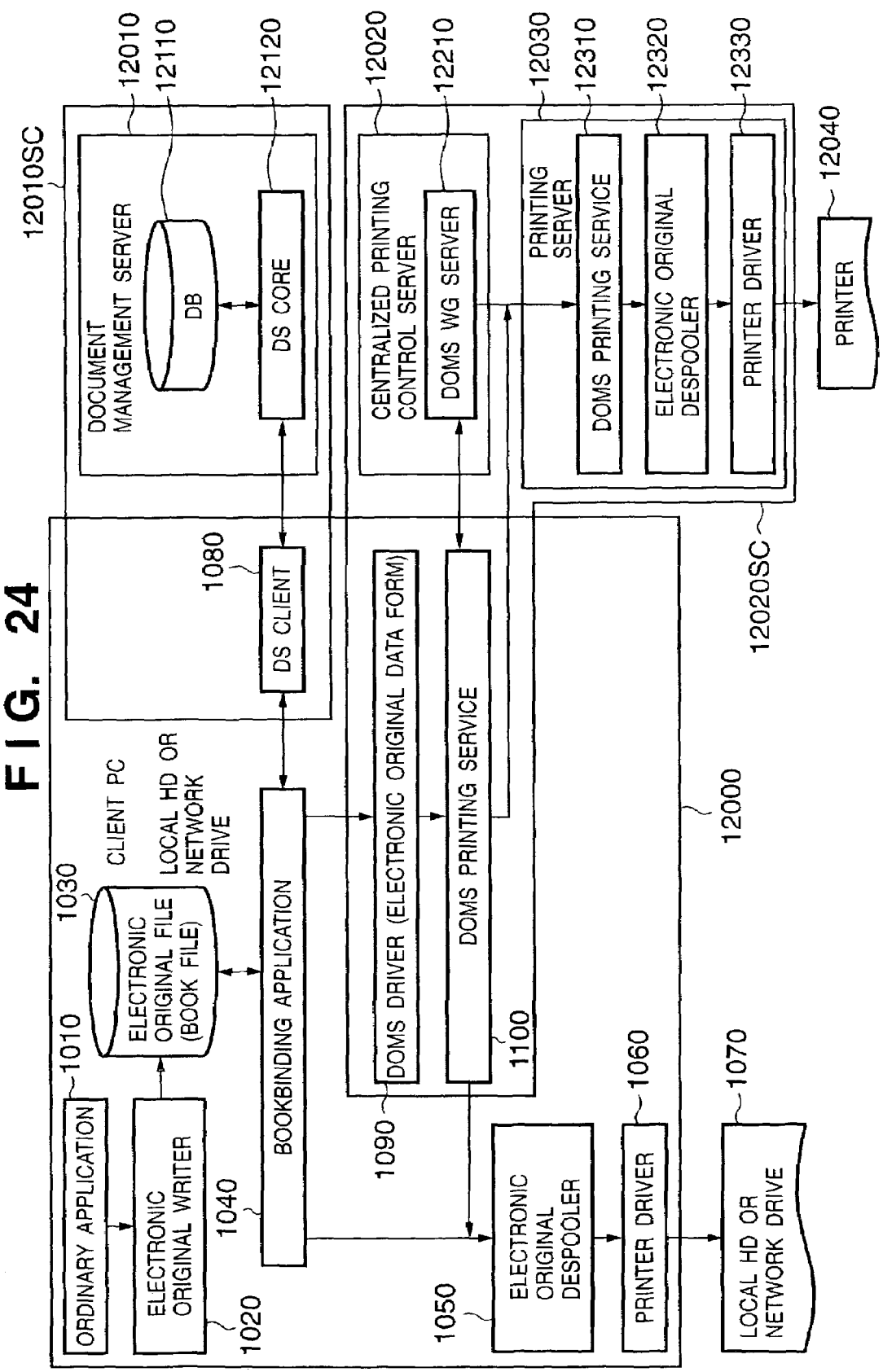
FIG. 24 is a block diagram of a client-server type of document processing system.

FIG. 24 is a block diagram showing the configuration of a server-client type of document processing system. A client document processing system has such a configuration that client modules: a document output management service (DOMS) driver 1090, a DOMS printing service module 1100, an document service (DS) client module 1080 are added to the standalone system. A document management server, a centralized printing control server 12020 and a printing server 12030 are connected to the client document processing system 12000. Ordinarily, these servers are connected to the client document processing system through a network. However, if the servers function simultaneously as the client, they are connected by interprocess communication simulating an internetwork communication. In the state illustrated in FIG. 24, both the document management server 12010 and the centralized printing control server 12020 are connected to the client. However, only one of them may exist on the network. If the only one connected server is the document management server, a document management server client system 12010SC including its client modules is added to the standalone document processing system. If the only one connected server is the centralized printing control server 12020, a centralized printing control server system 12020SC including its client modules is added to the standalone document processing system.

The document management server 12010 stores book files produced and edited by bookbinding application 1040. In the case of management of book files by the document management server 12010, book files are stored in a data base 12110 in the document management server 12010 instead of being stored in the local HD of the client PC or while being stored in the HD. A book file is saved to or read out from the document management server 12010 by the bookbinding application 1040 via a DS client 1080 and a DS core 12120.

The centralized printing control server 12020 controls printing of book files stored in the client document management system 12000 or in the document management server 12010. A printing request made in the client is transmitted to a DOMSWG server module 12210 in the centralized printing control server 12020 via the DOMS driver 1090 and the DOMS printing service module 1100. The centralized printing control server 12020 delivers electronic original data to the electronic original despooler 1050 through the DOMS print service module 1100 of the client if the data is printed by the client's printer. The centralized printing control server 12020 transmits the electronic original data to a DOMS print service module 12310 of the printing server 12030 if the data is printed by the printing server 12030. For example, the centralized printing control server performs a security check on the qualification or the like of a user who issues a request for printing of a stored book file, and stores a log of printing processing. Thus, the document processing system of the present invention can be realized as either of a standalone system and a client-server system.

<Contents of Preview Display>

As described above, when a book file is opened by the bookbinding application, the user interface window 11000 shown in FIG. 22 is displayed. In the tree section 11010, a tree representing the structure of an open book is displayed. Three display modes are prepared for display in the preview section and are selectively set by being designated by a user. The first mode is an original view mode in which original pages are displayed as they are. In the original view mode, the contents of each original page belonging to the open book are displayed. A layout is not reflected in the display in the preview section. The second mode is a print view mode in which original pages are displayed so that a layout of the original pages is reflected in the preview section 11020. The third mode is a simplified print view mode in which the contents of original pages are not reflected in the display in the preview section, and in which only a layout is reflected in the display.

Embodiments of the present invention relating to the electronic original despooler 1050 will now be described.

<First Embodiment>

A preferred embodiment of the present invention will be described.

Figure 1:
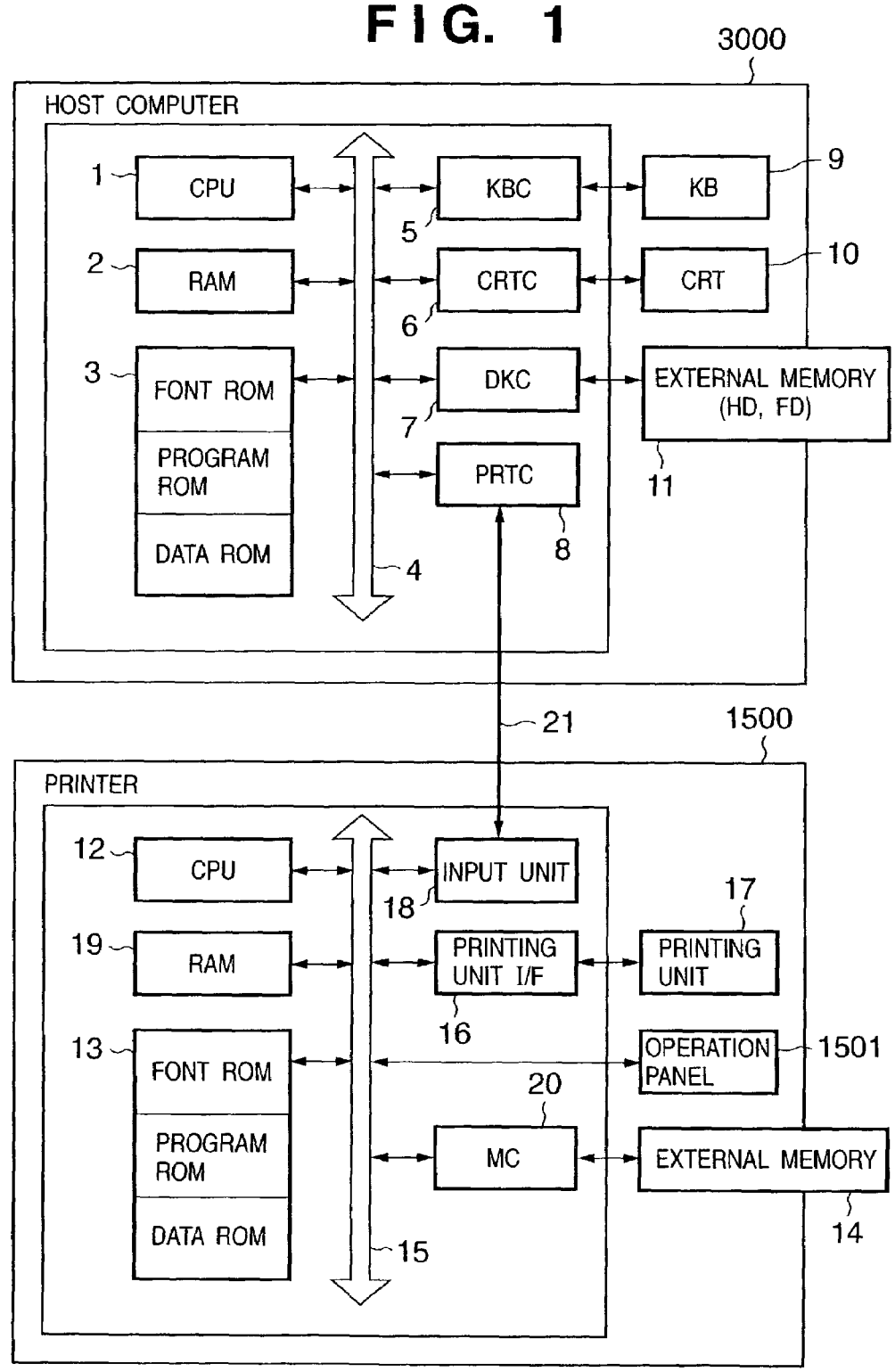
FIG. 1 is a block diagram showing a configuration of an information processing apparatus which represents an embodiment of the present invention.

FIG. 1 is a block diagram showing a configuration of a printer control system in which the information processing system of the present invention can be suitably implemented. The present invention can be applied to a single-unit apparatus, a system formed of a plurality of apparatuses, a system in which processing is performed by establishing connections through a network such as a local area network (LAN) or a wide area network (WAN) if printing control in accordance with the present invention can be executed.

Referring to FIG. 1, a host computer 3000 which is one embodiment of the information processing apparatus of the present invention has a CPU 1 which executes processing on a document in which figures, images, characters, tables (including a spreadsheet) exist mixedly on the basis of a document processing program, etc., stored in a program ROM in a ROM 3 or in an external memory 11. The CPU 1 performs overall control on devices connected to a system bus 4.

An operating system program (hereinafter referred to as "OS") for control of the CPU 1 and other programs are stored in the program ROM in the ROM 3, or in the external memory 11. Font data or the like used in the above-mentioned document processing is stored in a font ROM in the ROM 3, or in the external memory 11. Various sorts of data used when the above-mentioned document processing, etc., are performed are stored in a data ROM in the ROM 3, or in the external memory 11. A RAM 2 functions as a main memory, a work area or the like for the CPU 1.

A keyboard controller (KBC) 5 controls key inputs from a keyboard 9 and a pointing device (not shown). A cathode ray tube controller (CRTC) 6 controls display on a CRT display 10. A disk controller (DKC) 7 controls access to the hard disk (HD) on which a boot program, various applications, font data, user files, edited files, a printer control command generation program (hereinafter referred to as "printer driver"), etc., are stored, or the external memory 11, e.g., a floppy disk (FD). A printer controller (PRTC) 8 is connected to a printer 1500 through a bidirectional interface (interface) 21 and executes processing for control of communication with the printer 1500.

The CPU 1 executes, for example, processing for loading (rasterization) of outline fonts relating to display information set on the RAM 2 to enable WYSIWYG on the CRT 10. Also, the CPU 1 opens various registered windows on the basis of commands designated by a mouse cursor (not shown) or the like on the CRT 10, and executes various kinds of data processing. In execution of printing, a user can open a window relating to print settings to make a printer setting and settings in a printing processing method in the printer driver including making a selection from printing modes.

The printer 1500 is controlled by a CPU 12. The printer CPU 12 outputs an image signal as output information to a printing unit (printer engine) 17 connected to a system bus 15 on the basis of a control program, etc., stored in a program ROM in a ROM 13, or a control program, etc., stored in an external memory 14.

A program for control of the CPU 12, etc., are stored in the program ROM in the ROM 13. Font data, etc., used when the above-mentioned output information is generated are stored in a font ROM in the ROM 13. If the external memory 14 comprising a hard disk is not provided, information used on the host computer, etc., are stored in a data ROM in the ROM 13.

The CPU 12 can perform processing for communication with the host computer through an input unit 18 and can notify the host computer 3000 of information obtained in the printer, etc. A RAM 19 functions as a main memory, a work area or the like for the CPU 12. The memory capacity of the RAM 19 can be increased by connecting an optional RAM to an expansion port (not shown). The RAM 19 is used as an output information loading area, an environment data storage area, an NVRAM, etc. A memory controller (MC) 20 controls access to the external memory 14, e.g., a hard disk (HD) or an IC card. The external memory 14 is connected as an option, and stores font data, an emulation program, form data, etc. Reference numeral 18 denotes the above described operation panel in which operating switches, an LED indicator, etc., are provided.

A plurality of the above-described external memories 14 may be provided. The arrangement may be such that a plurality of external memories in which fonts other than the internal fonts and programs for enabling interpretation of printer control languages in different language systems are stored can be connected. Further, an NVRAM (not shown) may be provided to store printer mode setting information from the operation panel 1501.

Figure 2:
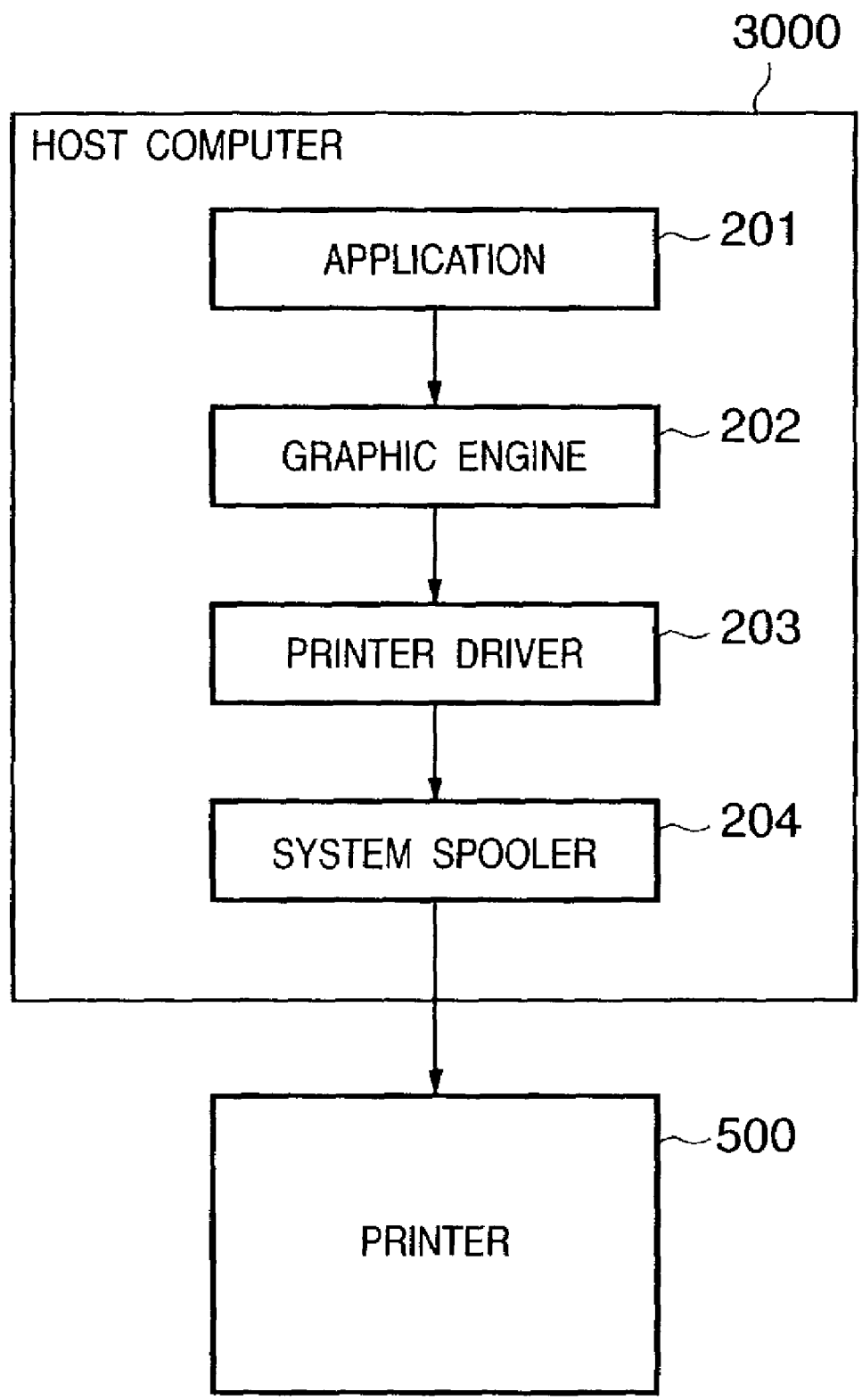
FIG. 2 is a block diagram showing a configuration of a typical printing system constituted by a host computer to which a printer is connected.

FIG. 2 is a diagram showing typical printing processing in the host computer to which a printing apparatus or the like is connected directly or via a network. An application 201, a graphic engine 202, a printer driver 203 and a system spooler 204 are program modules which exist as files stored in the external memory 11, and which are loaded into the RAM 2 to be executed by the OS and a program module using them. The application 201 and the printer driver 203 can be added to the HD provided as an external disk 11 via the FD provided as external memory 11 or via a network (not shown). The application 201 stored in the external memory 11 is executed by being loaded into the RAM 2. When printing is performed by outputting data from this application 201 to the printer 1500, outputting (drawing) is performed by using the graphic engine 202 also made executable by being loaded into the RAM 2.

The graphic engine 202 also loads the printer driver 203 prepared for each printing apparatus from the external memory 11 into the RAM 2, and sets an output from the application 201 in the printer driver 203. The graphic engine 202 converts a graphic device interface (GDI) function received from the application 201 into a device driver interface (DDI) function, and outputs the DDI function to the printer driver 203. The printer driver 203 converts given output commands into control commands recognizable by the printer, e.g., commands in a page description language (PDL) on the basis of the DDI function received from the graphic engine 202. The converted printer control commands are output as printing data to the printer 1500 by the OS through the system spooler 204 loaded by RAM 2 and the interface 21.

Figure 3:
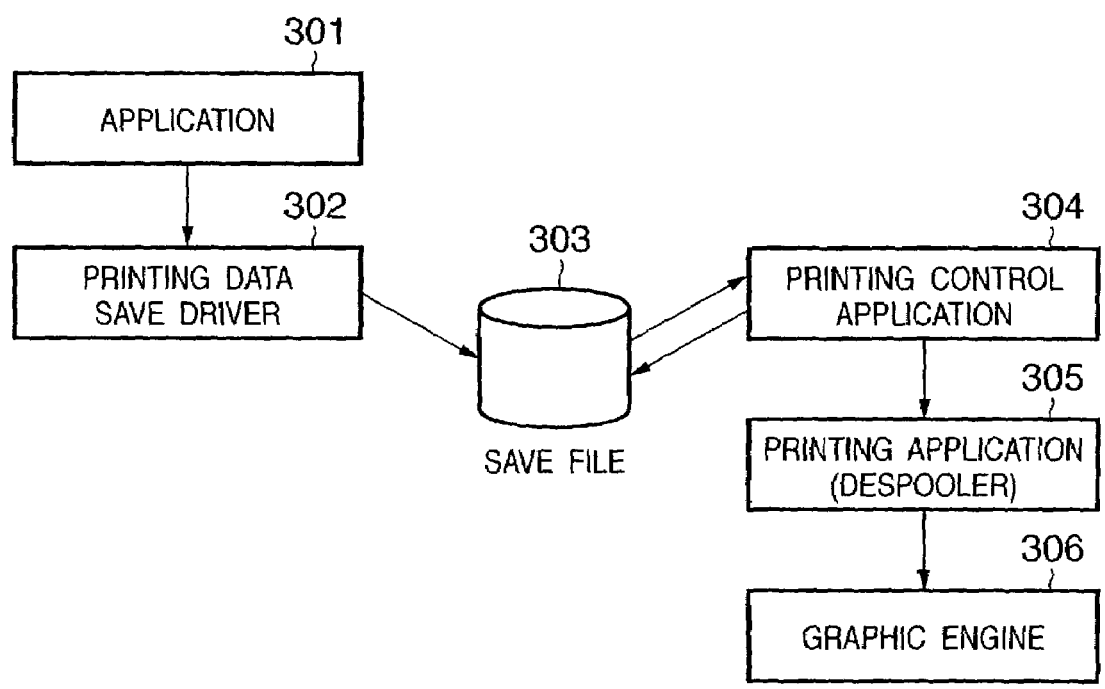
FIG. 3 is a block diagram showing a configuration of a system in which intermediate codes are spooled before printing commands from an application are converted into printer control commands.

The printing system of this embodiment includes, as shown in FIG. 3, an arrangement for spooling printing data from an application in an intermediate code in addition to the printing system formed by the printer and the host computer as shown in FIG. 2.

The system shown in FIG. 3 is formed by expanding the system shown in FIG. 2 so that when a printing instruction is sent from the graphic engine 202 to the printer driver 203, a save file 303 in an intermediate code is produced.

In the expanded system shown in FIG. 3, a function for enlargement/reduction on printing data from an application, a function for enabling a plurality of pages to be printed on one page by being scaled down from the printing data, etc., not provided in the application, can be realized by means of the intermediate code. To enable processing on printing data, it is necessary to make a setting through a window provided by an ordinary printing control application and store the contents of the setting on the RAM 2 or the external memory 11. A printing data save driver 302 corresponds to the above-described electronic original writer 1020. In the above-described embodiment, the PDF or a like format is used for electronic original files. In this embodiment, data in the corresponding format is called intermediate code data. A printing control application 304 corresponds to the above-described bookbinding application 1040. The electronic original writer 1020 and the bookbinding application 1040, whose functions are explained in the description of the above-described embodiment, are installed (incorporated) in the system simultaneously with reach other since they are requisites for each other.

The system shown in FIG. 3 will be described in more detail. In this expanded processing system, as shown in FIG. 3, printing data from an application 301 is saved in the intermediate save file 303 on the system through the printing data save driver 302 (electronic original writer 1020). In this intermediate save file 303, printed matter contents data (intermediate code data), print setting data (corresponding to DEVMODE of Windows OSs), etc., are saved.

"Printed matter contents data" is intermediate code data of data produced on an application by a user. "Print setting data" is data in which the way in which the contents data is output (an output format, etc.) is described.

The printing control application 304 reads data stored in the save file 303. The printing control application 304 can change the format of a print output from the data read from the save file 303, display the changed format, save the changed data, and control printing of the resulting data. The printing application (corresponding to the above-described electronic original despooler 1050, hereinafter referred to simply as "despooler") 305 receives the data for actual execution of printing (the above-described book file data) from the printing control application 304, and outputs to the graphic engine 306 the data in the form of a GDI function according to the output format set by the printing control application 304.

The graphic engine 306 coverts the GDI function into a DDI function supported by the printer driver, and thereafter the printer driver 203 produces printing data including printer control commands in a page description language or the like on the basis of the DDI function obtained from the graphic engine 306, ties up the commands by a job language (JL) to form a printing job, and outputs the printing job to the system spooler 204. The printing job is output to the printer 1500 by the OS controlling the system spooler 204.

Figure 4:
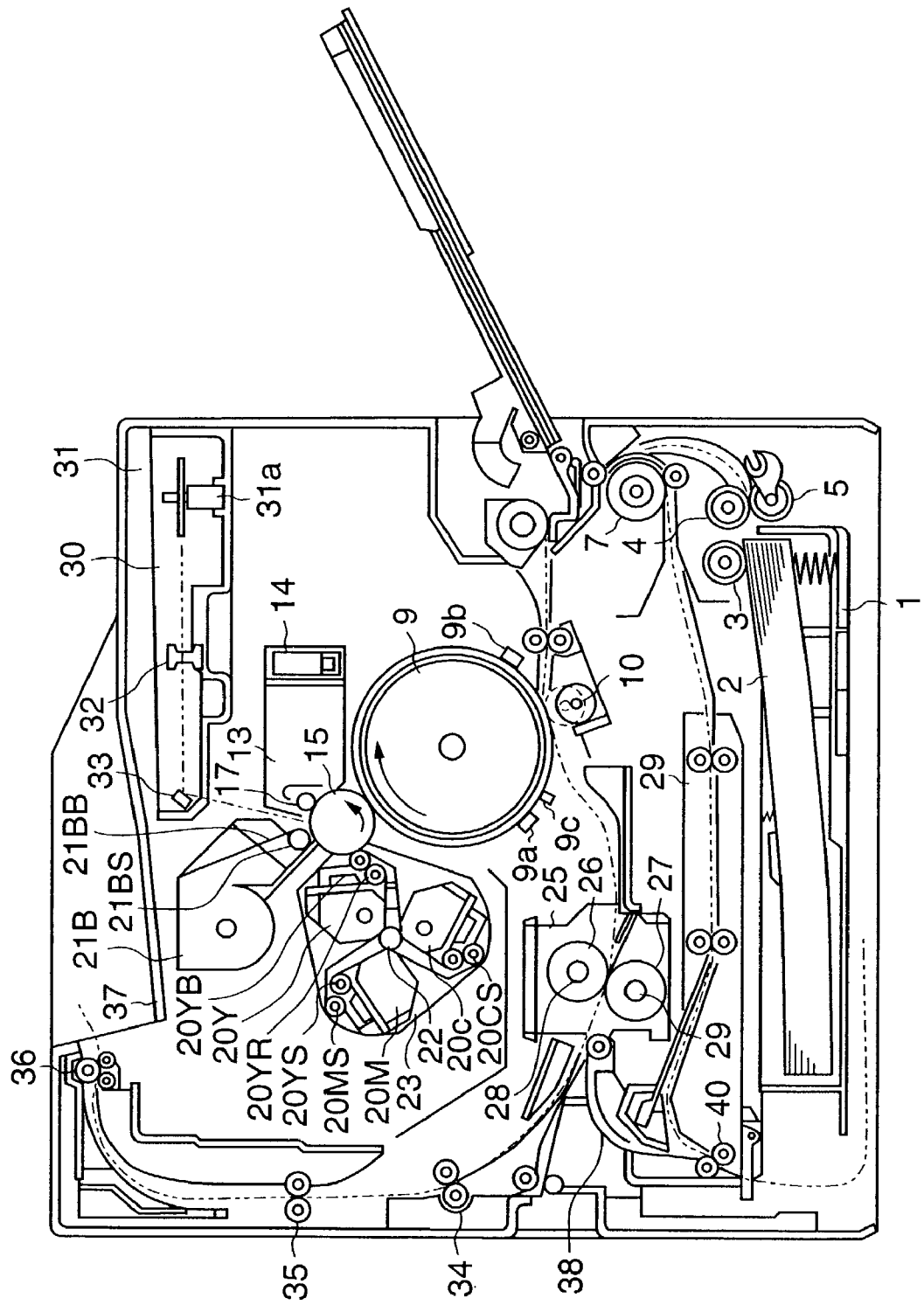
FIG. 4 is a diagram for explaining a printer used in accordance with the embodiment of the present invention.

FIG. 4 is a cross-sectional view of an example of the printer 1500, which is a multicolor laser printer having a double-sided printing function.

In this printer, a laser beam is modulated with image data with respect to each of a plurality of colors on the basis of printing data input from the host computer 3000, and a photosensitive drum 15 is scanned with the laser beam by using a polygon mirror 31 to form an electrostatic latent image. This electrostatic latent image is toner-developed to obtain a visualized image. Multiple images thus obtained with respect to all the colors are transferred to an intermediate transfer member 9 to form a visible multicolor image. This visible multicolor image is transferred to a transfer medium 2 and fixed on this member. An image forming unit which controls these operations is constituted by a drum unit including the photosensitive drum 15, a primary charged part having a contact charged roller 17, a cleaning unit, a developing unit, the intermediate transfer member 9, a sheet feed unit including a sheet cassette 1 and various rollers 3, 4, 5, and 7, a transferring unit including a transferring roller 10, and a fixing unit 25.

In the drum unit 13, the photosensitive (photosensitive member) 15 and a cleaner container 14 having a cleaning mechanism and also serving as a holder for the photosensitive drums (photosensitive body) 15 are combined integrally with each other. This drum unit 13 is arranged as an interchangeable unit detachably supported on a printer main body and easily replaceable at the end of the life of the photosensitive drum 15. The photosensitive drum 15 is constituted by an aluminum cylinder and an organic photoconductor layer formed on the peripheral surface of the aluminum cylinder by application of an organic photoconductor material. The photosensitive drum 15 is rotatably supported on the cleaner container 14 and is rotated by a driving force of a drive motor (not shown) transmitted to the photosensitive drum 15. The drive motor rotates the photosensitive drum 15 counterclockwise according to the image forming operation. The surface of the photosensitive drum 15 is selectively exposed to form an electrostatic latent image. In a scanner unit 30, each modulated laser beam is reflected by the polygon mirror rotated by a motor 31a in synchronization with a horizontal sync signal in an image signal, passes through a lens 32 and a reflecting mirror 33, and finally strikes on the photosensitive drum.

The developing unit has components for visualizing the electrostatic latent image: three color developing devices 20Y, 20M, and 20C for development in yellow (Y), magenta (M), and cyan (C), and one black developing device 21B for development in black (B). The color developing devices 20Y, 20M, and 20C and the black developing device 21B respectively have sleeves 20YS, 20MS, 20CS, and 21BS, and application blades 20YB, 20MB, 20CB, and 21BB maintained in pressure contact with the peripheral surfaces of the sleeves 20YS, 20MS, 20CS, and 21BS. The three color developing devices 20Y, 20M, and 20C are provided with application rollers 20YR, 20MR, and 20CR.

The black developing device 21B is detachably mounted on the printer main body, while the color developing devices 20Y, 20M, and 20C are detachably mounted on a developing rotary 23 which rotates on a rotary shaft 22.

The sleeve 21BS of the black developing device 21B is positioned so that a small gap of about 300 μm is formed between the sleeve 21BS and the photosensitive drum 15. The black developing device 21B feeds toner with a feed-in member incorporated in the device, and applies charge to the toner by triboelectric charging to enable the toner to be applied to the outer peripheral surface of the sleeve 21BS rotating clockwise by means of an application blade 21BB. Also, a developing bias is applied to the sleeve 21BS to perform development on the photosensitive drum 15 according to the electrostatic latent image, thereby forming a visible image on the photosensitive drum 15 by black toner.

During image forming, the three color developing devices 20Y, 20M, and 20C rotate with the rotation of the developing rotary 23, and the sleeves 20YS, 20MS, and 20CS are selectively made to face the photosensitive drum 15 with a small gap of about 300 μm formed therebetween. In this manner, each of the color developing devices 20Y, 20M, and 20C is stopped at a developing position such as to face the photosensitive drum 15 to form a visible image on the photosensitive drum 15.

During color image forming, each time the intermediate transfer member 9 makes one revolution, the developing rotary 23 rotates to enable a developing step with one of the yellow developing device 20Y, the magenta developing device 20M, the cyan developing device 20C, and the black developing device 21B successively used in this order. While the intermediate transfer member 9 makes four revolutions, visible images are successively formed by yellow, magenta, cyan and black toners, thereby forming a visible full-color image on the intermediate transfer member 9.

The intermediate transfer member 9 rotates with the rotation of the photosensitive drum 15 while being maintained in contact with the photosensitive drum 15. During color image forming, the intermediate transfer member 9 rotates clockwise to undergo four cycles of transfer for the multiple visible images from the photosensitive drum 15. Also, for image forming, a transfer roller 10 described below is brought into contact with the intermediate transfer member 9 to convey a transfer medium 2 in a state of being pinched between the intermediate transfer member 9 and the transfer roller 10, thereby performing multiple image transfer of the visible color image from the intermediate transfer member 9 onto the transfer medium 2 at a time. A TOP sensor 9*a* and an RS sensor 9*b* for detecting the position of the intermediate transfer member 9 along the direction of rotation and a density sensor 9*c* for detecting the density of the toner image transferred the intermediate transfer member 9 are provided in peripheral portions of the intermediate transfer member.

The transfer roller 10 has a transfer charger and is pivotally supported as to be able to move closer to and away from the photosensitive drum 15. The transfer roller 10 is formed by wrapping a medium-resistance foamed elastic material around a metallic shaft.

While multiple image transfer of visible color images to the intermediate transfer member 9 is being performed, the transfer roller 10 is separated from the intermediate transfer member 9 by being moved downward, as indicated by the solid line in FIG. 4, in order to avoid disturbance in the visible color images. After the four-color visible image has been formed on the above described intermediate transfer member 9, the transfer roller 10 is set at the upper position indicated by the dotted line by the operation of a cam member (not shown) at a time when the visible color image is to be transferred onto the transfer medium 2. The transfer roller 10 is thereby pressed against the intermediate transfer member 9 through the transfer medium 2 by a predetermined pressing force, while a bias voltage is applied to the transfer roller 10, thereby transferring the visible color image from the intermediate transfer member 9 onto the transfer medium 2.

The fixing unit 25 fixes the transferred visible multicolor image while conveying the transfer medium 2. The fixing unit 25 has a fixing roller 26 for heating the transfer medium 2 and a pressing roller 27 for maintaining the transfer medium 2 in pressure contact with the fixing roller 26. The fixing roller 26 and the pressing roller 27 are formed so as to have hollow inner spaces in which heaters 28 and 29 are respectively inserted. That is, the transfer medium 2 carrying the visible color image is conveyed by the fixing roller 26 and the pressing roller 27 while heat and pressure are applied to the transfer medium 2 by the fixing roller 26 and the pressing roller 27, thereby fixing toner on the medium surface.

The transfer member 2 after fixing of the visible image is discharged through a sheet discharge portion 37 by discharge rollers 34, 35, and 36, thus completing the image forming process.

Cleaning means are provided to remove toner remaining on the photosensitive drum 15 and the intermediate transfer member 9. Waste toner after transfer of the visible toner image formed on the photosensitive drum 15 to the intermediate transfer member 9 or waste toner after transfer of the visible four-color image formed on the intermediate transfer member 9 to the transfer medium 2 is collected and accumulated in the cleaner container 14.

Transfer medium (recording sheet) 2 to be used for printing is taken out from a sheet tray 1 by a feed roller 3 and is conveyed by being pinched between the intermediate transfer member 9 and the transfer roller 10 while a color toner image is recorded. When the recording sheet passes through the fixing unit 25, the toner image is fixed. In the case of one-sided printing, a guide 38 forms a conveyance path for guiding the recording sheet to the sheet discharge portion above. In the case of double-sided printing, the guide 38 forms a path for guiding the recording sheet to a two-side unit below.

The recording sheet guided to the two-side unit is temporarily conveyed into a position below the tray 1 (a conveyance path indicated by the double-dot-dash line) by means of a conveying roller 40 and is thereafter conveyed in the reverse direction onto a two-side tray 39, on which the recording sheet is placed with the reverse surface up relative to the state of being placed on sheet tray 1. The leading and trailing ends are also reversed in position with respect to the conveyance direction. The sheet is conveyed from this position and transfer and fixation of a toner image thereon are again performed, thus completing double-sided printing.

Figure 5:
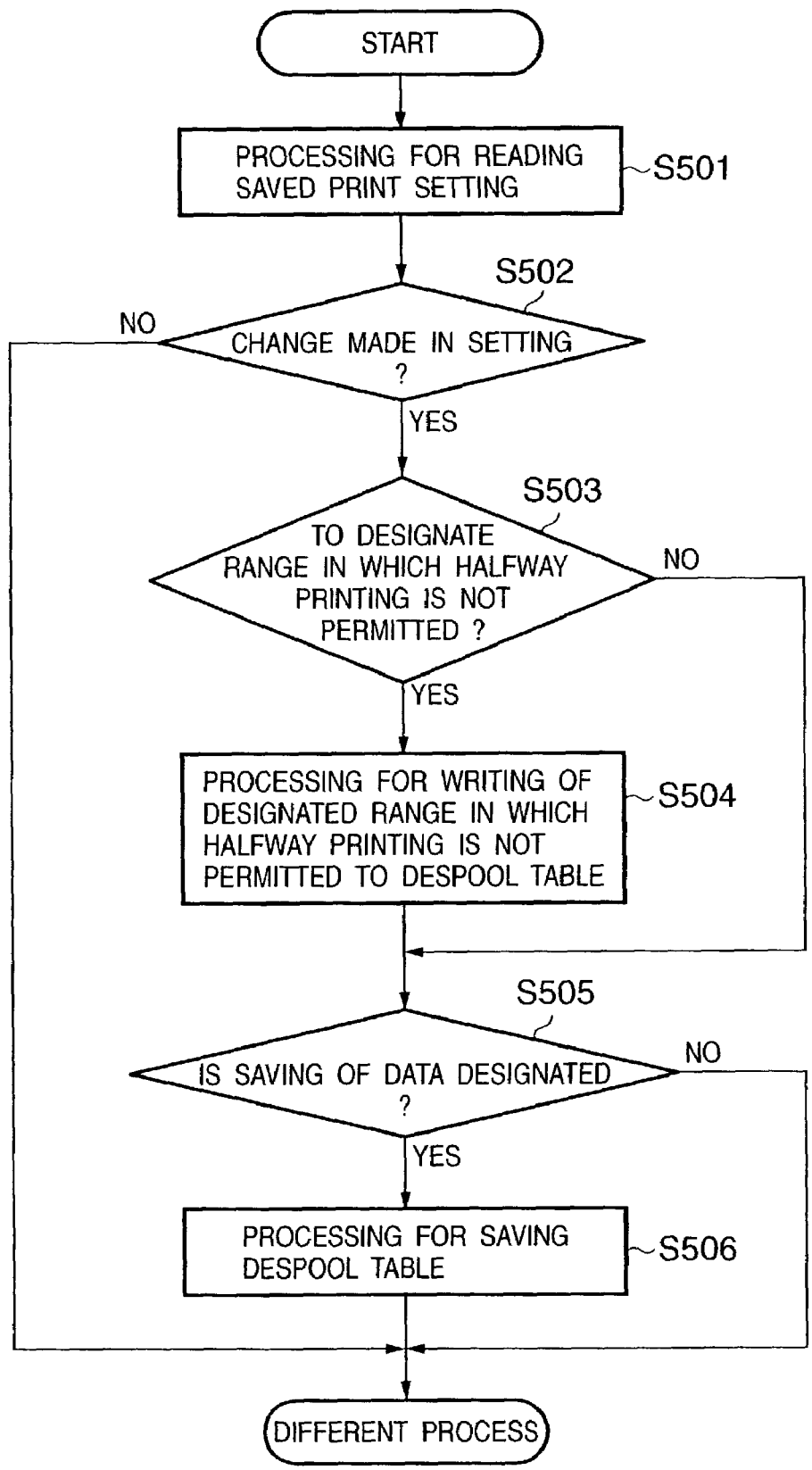
FIG. 5 is a flowchart for explaining a data saving process when a printing control application makes a change in a print setting in data stored in a save file.
Figure 6:
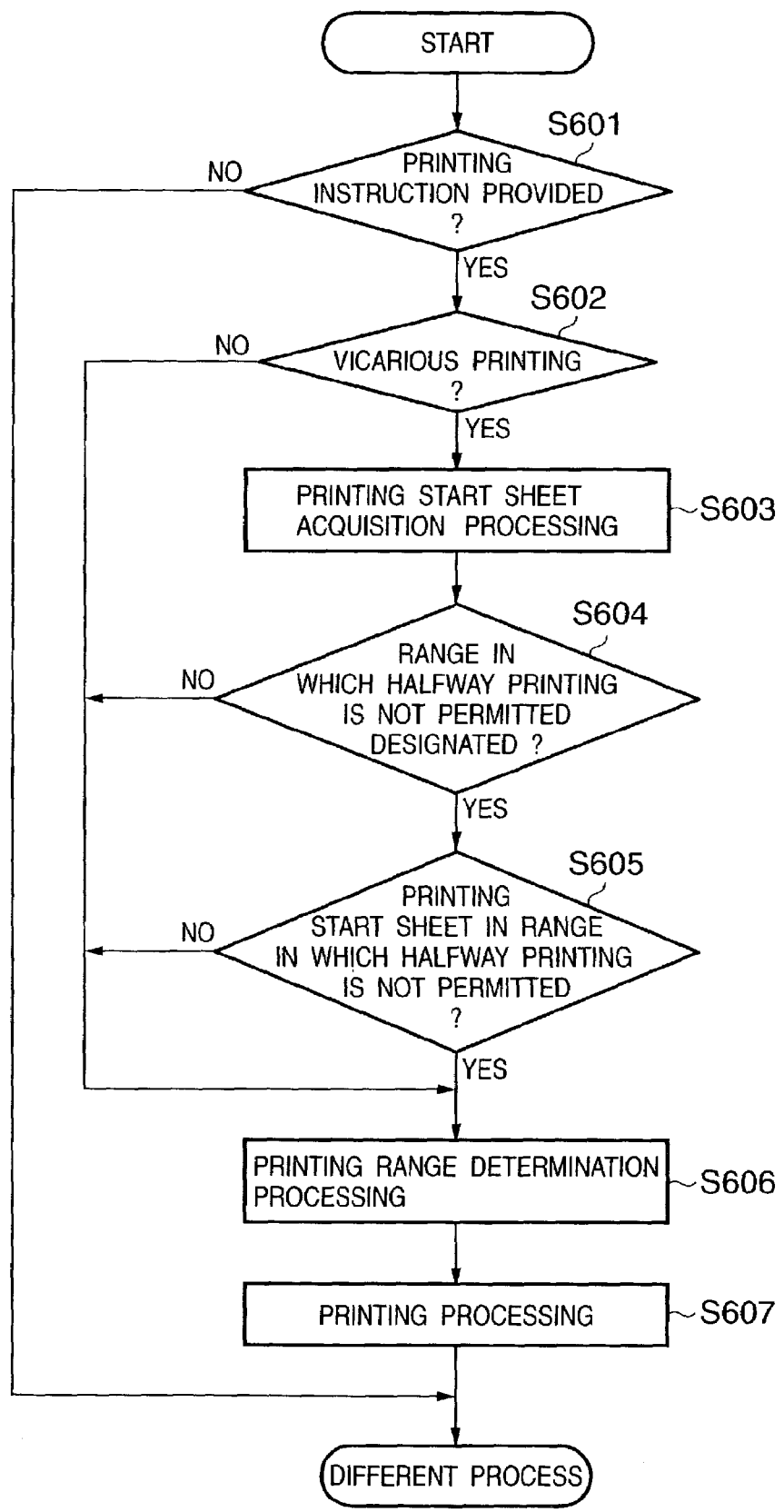
FIG. 6 is a flowchart for explaining processing in a printing application.
Figure 7:
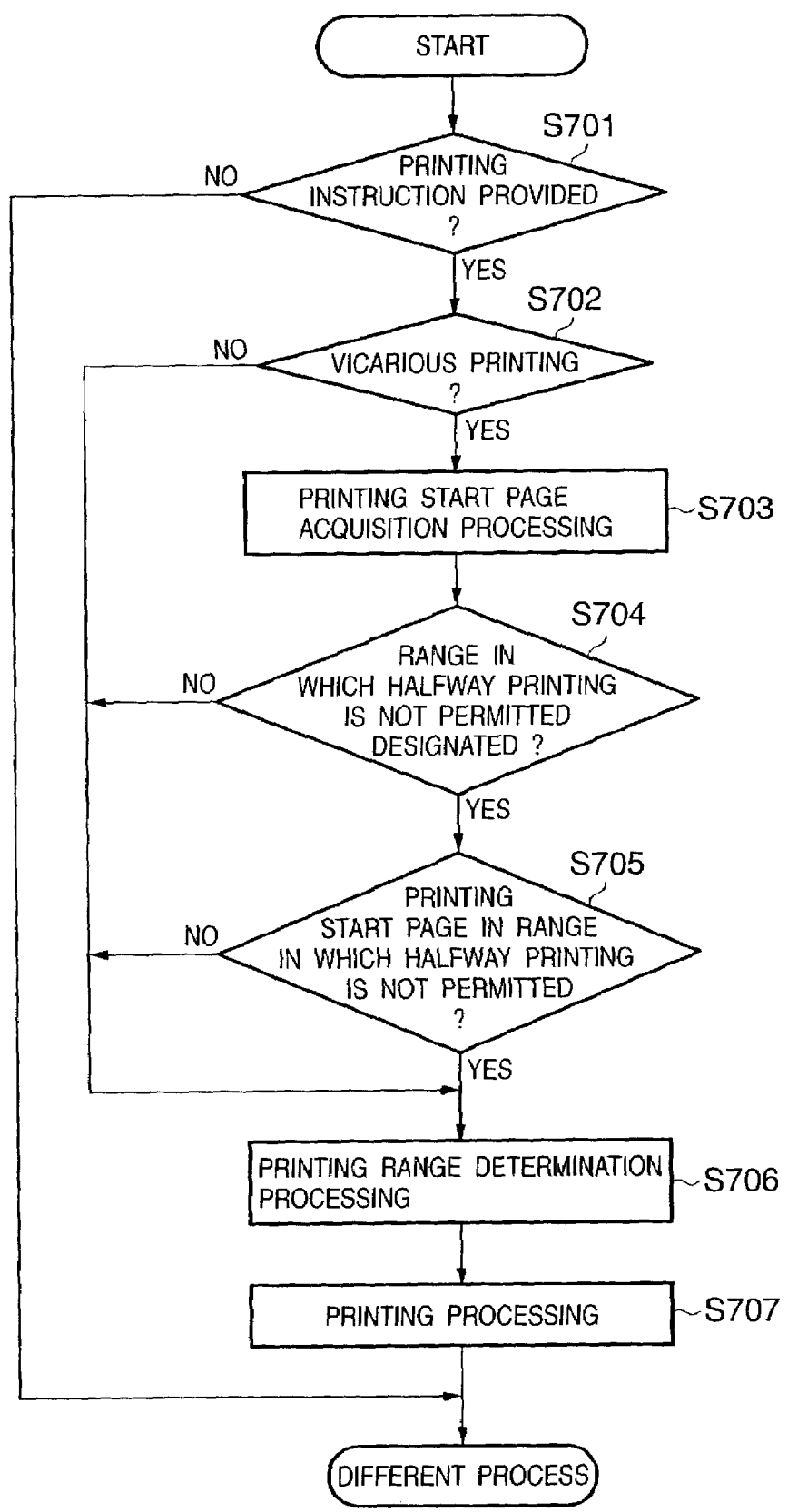
FIG. 7 is a flowchart for explaining processing in a printing application.

FIGS. 5 to 7 are flowcharts for explaining processing in printing control application 304 and processing in printing application (despooler) 305 specific to this embodiment of the present invention.

Figure 8:
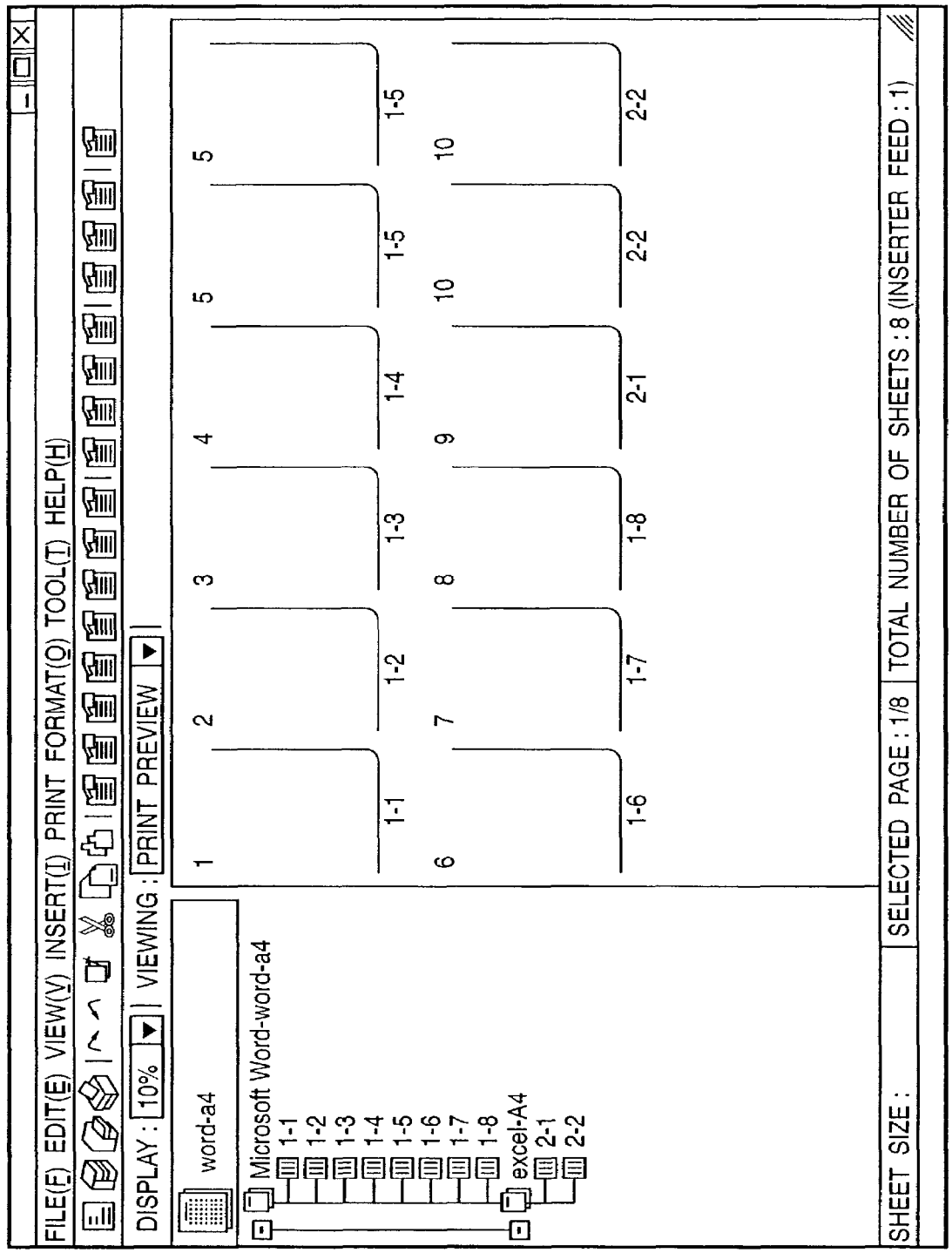
FIG. 8 is a diagram showing an example of a user interface of a printing control application.

Interface windows shown in FIGS. 8 and 9 are used as input windows for inputting instructions to make changes in data in save file 303 (corresponding to the above-described electronic original file). The interface window shown in FIG. 8 is a window for operations on printing control application 304, and the interface window shown in FIG. 9 is an example of a window for inputting selections relating to changes in print settings made through the interface window shown in FIG. 8. Data having such a structure that its minimum units correspond to original pages is produced each time a printing job is performed. Sheets or pages thereof on which changes in data will be made are designated through the interface window shown in FIG. 8, and designated objects are set through the interface window shown in FIG. 9. According to changes in settings, the printing control data related to the printing data is changed.

An example of settings through the interface window shown in FIG. 9 will be described. FIG. 9 shows a case in which "bookbinding printing" is set by designation 901 of a printing method. In printing method designation, one-sided printing or double-sided printing may alternatively be set. Through this interface window, an opening method (902), adjustment of the original (903), and a bookbinding printing method (904), e.g., a method of printing all the pages in one sequence or a method of printing on sheets grouped into a certain number of batches can also be designated. Further, through this interface window, a setting with respect to chapter boundaries (905) can be designated. For opening method (902) setting, a checkbox for selecting "saddle stitch" (central stapling) and a checkbox for selecting setting of a bookbinding stitch margin are also provided as well as a menu for selection among "right opening," "left opening," "top opening," and "bottom opening."

FIG. 5 is a diagram showing a process for saving data when a change in a print setting in data saved in the save file 303 is made by the printing control application 304. While a change in a print setting is made through the printing control application 304, processing for saving data relating to the change is performed by the printing data save driver 302 (electronic original writer 1020) called up by the printing control application 304 (bookbinding application 1040).

When the printing data save driver 302 reads intermediate data (electronic original file) stored in the save file 303 after being called up by the printing control application 304, it first reads print settings in the saved intermediate data (S501). In this is processing, setting data set for control of printing is read from the data structure DEVMODE provided by the OS through the save file 303 and is loaded on a load area on the memory called a despool table. The read print setting includes information designating a printing range required by a printing module at an output destination, e.g., the above-mentioned DOMS driver 1090, as well as values set by a user through the print setting GUI (e.g., the one shown in FIG. 9) of the printing control application 304

(bookbinding application 1040). This is because there is a possibility of the centralized printing control server 12020 requesting the printer 12040 to perform reprinting while designating through the DOMS driver 1090 a printing range in the bookbinding application 1040 the DOMS driver 1090, for example, when some fault occurs during printing processing.

In step S502, processing for a determination as to whether a setting change has been made is performed. In this step, a determination is made as to whether a setting change instruction operation has been made on the interface of the printing control application 304 shown in FIG. 9. If it is determined that a setting change instruction operation has been made (YES in S502), the process advances to step S503. In step S503, a decision is made to designate or not designate a range in which halfway printing is not permitted on the basis of a printing range designated by the user through the GUI for "Book Detail Setting" or a printing range designated from a different printing module (e.g., the DOMS driver) and print settings input through the user interface shown in FIG. 9.

As mentioned above, the job ticket is data in such a structure that minimum units of the data correspond to original pages. When setting change is made, the relating printing control data in the job ticket is changed.

"Halfway printing" is, for example, a printing process in which one printing job is interrupted halfway and is thereafter restarted to be completed. With a possibility of such halfway printing considered, a need may arise to manage printing object data as one indivisible group of data by setting a range in which halfway printing is not permitted, depending on the existence/nonexistence of a certain print setting, e.g., a setting for separate-volume processing in bookbinding or a setting for partial stapling processing. It is possible to prohibit halfway printing with respect to designated tied groups of sheets by designating ranges in which halfway printing is not permitted. More specifically, in a case where stapling is designated, a range in which halfway printing is not permitted is set in correspondence with a range of stapling (ordinarily the range covering all the pages, or a range corresponding to a unit volume in a case where separate volumes is designated in bookbinding printing). In a case where an Nup layout (in which N logical pages are arranged in one physical page by being scaled down) is designated as a page layout, a range in which halfway printing is not permitted is set in correspondence with a sequence of logical pages arranged on one printing sheet (by considering one-sided printing and double-sided printing).

Selection as to which one of the settings in the printing control application 304 is made as a setting requiring prohibition of halfway printing when a setting change is made depends on the specifications of the relating applications. By this setting, the intention in printing control is communicated to the application that controls printing.

If a decision is made in step S503 to designate a range in which halfway printing is not permitted (YES in S503), the designated range is written to the despool table by the printing data save driver 302 (S504).

The despool table has a table structure such as shown in FIG. 10, in which settings are hierarchically managed as a print setting which is valid throughout the whole of a printing object document (book file), a print setting which is valid with respect to tied groups of sheets, and furthermore a print setting which is valid with respect to individual sheets.

In processing for write to the despool table in step S504, a range in which halfway printing is not permitted with respect to tied groups of sheets is set. If a decision is made in step S503 not to designate a range in which halfway printing is not permitted (NO in step S503), write to the despool table is not performed.

In step S505, a determination is made as to whether saving of data relating to a setting change has been designated. If it is determined that saving of the corresponding data has been designated (YES in S505), processing for saving the despool table is performed by the printing data save driver 302 (S506). In this processing, the contents of the print setting loaded on the despool table on the memory are written to the save file 303, thus enabling the contents of the setting change made in the printing control application 304 to be reflected in the save file 303.

Figure 11:
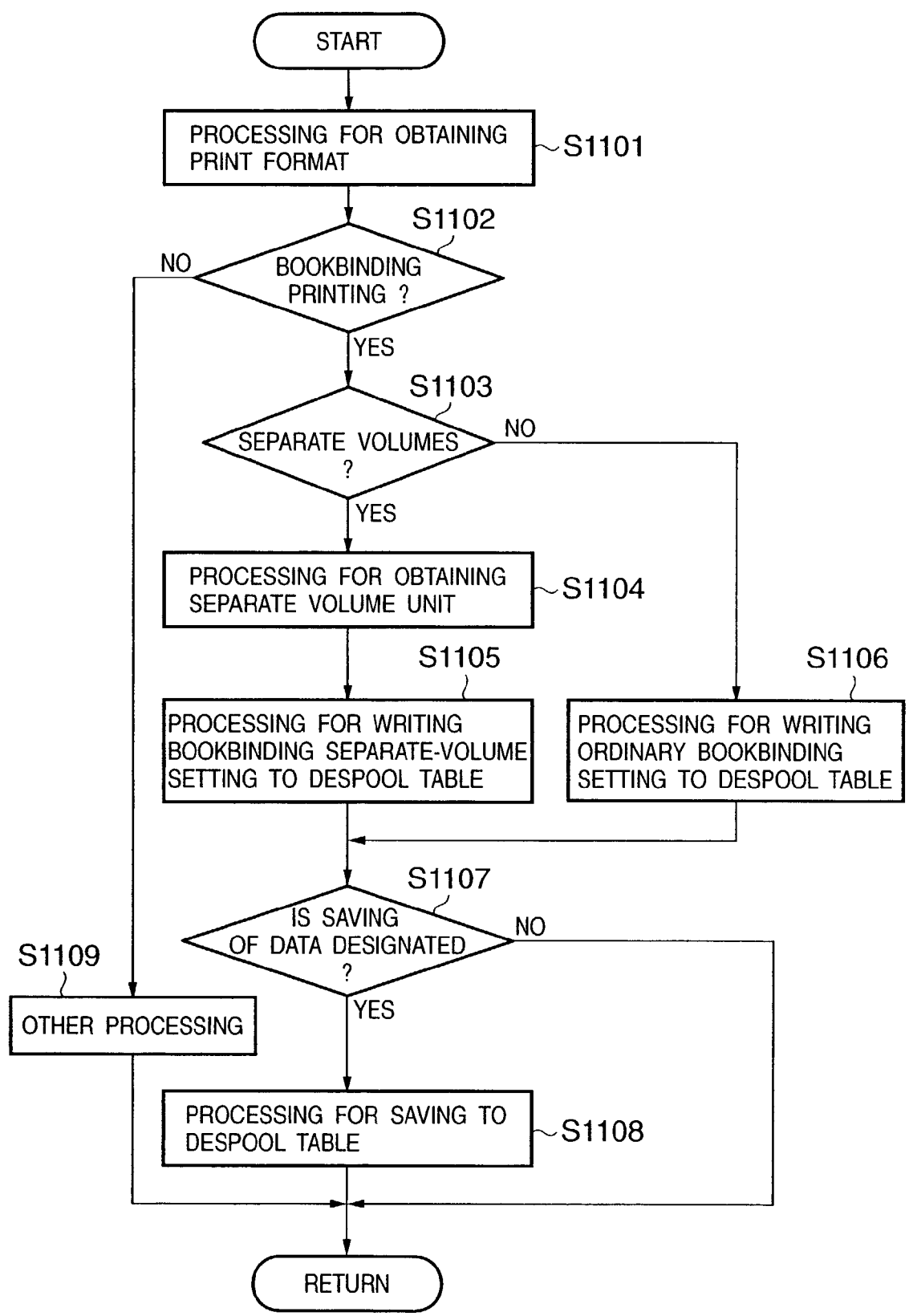
FIG. 11 is a flowchart showing an example of a process in the printing control application.

A data change process when bookbinding is selected will next be described with reference to the flowchart of FIG. 11.

The printing data save driver 302 is called up from the printing control application 304 to read intermediate data stored in the save file 303. The printing data save driver 302 first performs processing for obtaining the print format (S1101). In this processing, print setting data is read from the save file 303 and data relating to print format settings is loaded on a load area on a memory called a despool table. When data relating to format settings is loaded on the despool table, the process advances to step S1102 and processing is performed for determination as to whether the format settings include "bookbinding printing" and "making saddle stitch" (S1102). In step S1102, a determination is made as to whether a setting change has been made on the interface (GUI) of the printing control application shown in FIG. 9 to designate setting of "bookbinding printing." If it is determined that the format settings include "bookbinding printing" and "making saddle stitch" (YES in S1102), the process advances to step S1103 and processing for determination as to whether the bookbinding form is "separate volume" is performed (S1104).

If "printing on sheets grouped into batches" has been selected as bookbinding printing method (904) in the GUI settings shown in FIG. 9, separate-volume bookbinding is recognized. If a decision is made to perform separate-volume bookbinding (YES in S1103), the process advances to step S1104 and processing for obtaining volume units is performed (S1104). This step is processing for obtaining information on units in which separate volumes are formed. Thereafter, processing for writing the bookbinding separate-volume setting to the despool table is performed (S1105).

Figure 12:
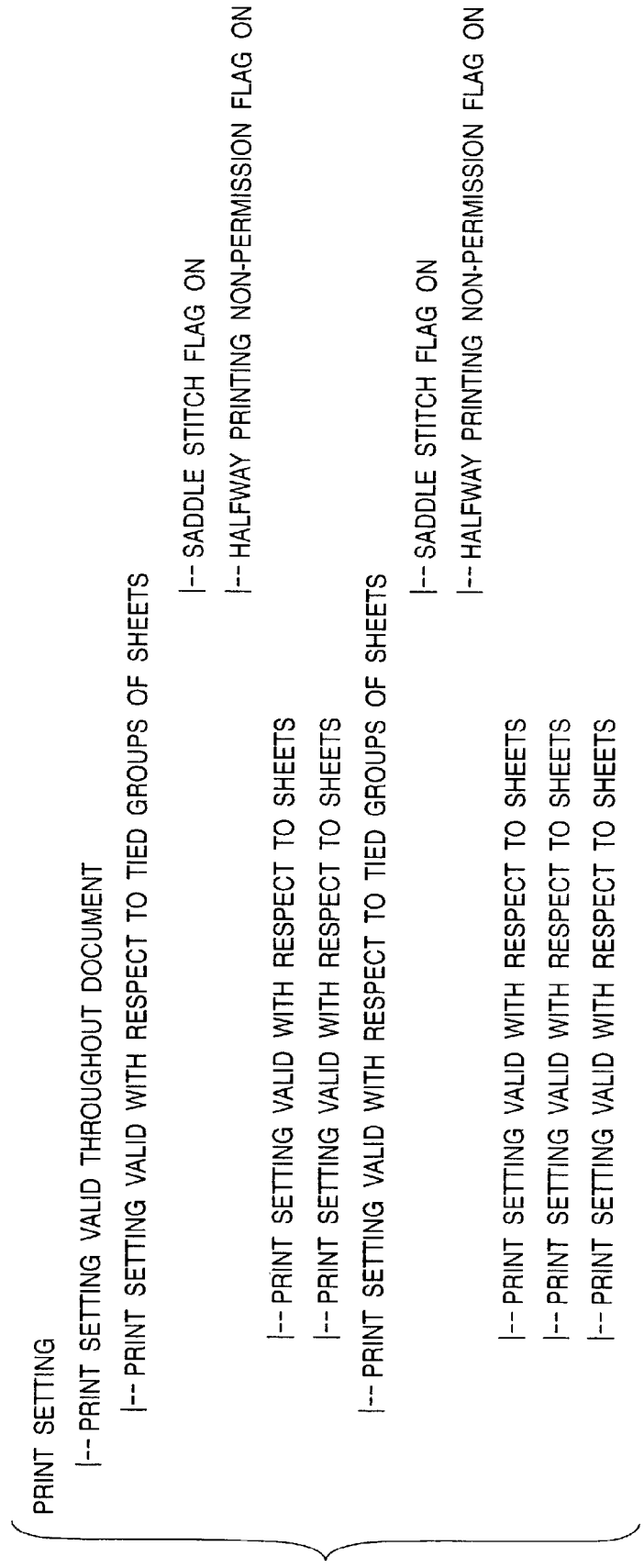
FIG. 12 is a diagram schematically showing a despool table.

This processing for write to the despool table is concretely performed in such a manner that, for example, as shown in FIG. 12, a flag for making saddle stitch and a halfway printing non-permission flag are set as print settings valid with respect to tied groups of sheets. In this example, a range in which halfway printing is not permitted is expressed by setting a halfway printing non-permission flag, and a flag designating saddle stitch is set as another setting.

The process then advances to step S1107 and a determination is made as to whether saving of data relating to a setting change has been designated. If it is determined that saving has been designated (YES in S1107), processing for saving the despool table is performed (S1108). In this processing, the contents of the print settings loaded on the despool table on the memory are written to the save file, thus enabling the bookbinding separate-volume setting to be reflected in the save file 303.

A process in the despooler 305 (the above-described electronic original despooler 1050) will be outlined with reference to FIG. 6.

In step S601, a determination is first made as to whether a printing instruction has been provided. This printing instruction checked in step S601 may be one from the printing control application that has previously performed saving or one from a different printing control application. If a printing instruction has been provided from the printing control application 304, the process advances to step S602. This printing instruction is assumed to be a printing instruction from a user or a printing instruction for "reprinting" or "vicarious printing" from the DOMS driver 1090. In step S602, a determination is made as to whether the provided printing instruction corresponds to "recovery printing" such as "vicarious printing" or "reprinting."

"Recovery printing" is performed if a printing error occurs on the device side for some reason to cause failure to complete a printing job. Recovery printing starts from the beginning of the unprinted portion of printing data printed halfway by the failed job. There are a plurality of methods for such recovery printing. For example, vicarious printing is processing for performing printing by changing the output-destination printer (printer driver), and reprinting is processing for making the same printer (printer driver) again perform printing.

The printing control application supplies a flag designating execution/non-execution of this recovery printing to the data loaded on the despool table. Decision about recovery printing in step S602 is based on reading the flag set by the printing control application 304.

If a decision is made by processing in step S602 to execute printing by recovery printing, printing start sheet acquisition processing is started (S603). In this processing, the despooler 305 obtains, from the printing control application, data designating one of the sheets for the entire document from which recovery printing is to be started.

A case where the recovery printing start sheet is the third sheet is will be described by way of example.

The process advances to step S604 and the despooler 305 makes a determination as to whether a range in which halfway printing is not permitted has been designated. This processing is for determining whether the printing control application has already set a range in which halfway printing is not permitted, as shown in FIG. 12. It is assumed here that a range in which halfway printing is not permitted is set from the first sheet to the fifth sheet out of the entire document.

In step S605, the despooler 305 executes processing for making a determination as to whether the printing start sheet is within the range in which halfway printing is not permitted. For example, if the recovery printing start page is the third page and if the range in which halfway printing is not permitted is from the first sheet to the fifth sheet, it is determined that recovery printing starts from a point within the range in which halfway printing is not permitted. If it is determined that, as in this case, recovery printing is in the range in which halfway printing is not permitted (YES in S605), then the process advances to step S606 and printing range determination processing is executed (S606). In this step, a range in which printing is actually performed is determined. Since the vicarious printing start sheet, i.e., the third sheet, is within the range in which halfway printing is not permitted, a decision is made not to execute recovery printing and a printing range covering the entire document is set. That is, in this example, the range from the first sheet to the final sheet for the document is set as a printing range.

Thereafter, the process advances to step S607 and printing processing is executed by the despooler 305. More specifically, the despooler 305 reads out intermediate code data stored in the save file 303, generates the GDI function prescribed in the graphic engine 306 of the OS, and outputs the GDI function. After the GDI function has been output to the graphic engine 306, the printer driver generates a printing job and outputs the printing job to the printer, as described above. Thus, halfway printing can be controlled by processing performed by the printing control application 304 and the printing application 305.

In this embodiment, in a case where a printing range is designated on a sheet-by-sheet basis at the time of printing with respect to output contents prescribed according to an intention in printing control before saving of printing data to the spooler, printing control reflecting the desired printing contents can be performed.

<Second Embodiment>

In the first embodiment, a printing start point determined on a sheet-by-sheet basis is set as printing start information in a case where vicarious printing is performed. However, in a case where double-sided printing for example is performed, a printing start point determined on a page-by-page basis, i.e., with respect to pages on front and back surfaces of sheets, may be set as printing start information finer than that on the sheet-by-sheet basis. A process in the despooler for executing vicarious printing by determining printing start page data will be described with reference to the flowchart of FIG. 7.

In step S701, a determination is first made as to the existence/nonexistence of a printing instruction from a printing control application. This printing instruction may be one from the printing control application that has previously performed saving or one from a different printing control application.

If a printing instruction has been provided from the printing control application 304 (YES in S701), the process advances to step S702 for determination as to execution/non-execution of vicarious printing.

In the vicarious printing determination step S702, a determination as to execution/non-execution of vicarious printing is made by reading a flag set by the printing control application 304. If execution of vicarious printing is determined by the processing in this step, the process advances to step S703 for printing start page acquisition processing. In this processing, data designating one of the sheets for the entire document from which recovery printing is to be started is obtained from the printing control application. It is assumed here that the third page for example is identified as a recovery printing start sheet.

Processing for determination as to whether a range in which halfway printing is not permitted has been designated is executed in step S704. This processing like that described above is for determining whether the printing control application has already set a range in which halfway printing is not permitted, as shown in FIG. 12. It is assumed here that a range in which halfway printing is not permitted is set from the first sheet to the fifth sheet.

In step S705, a determination is made on the above-described information as to whether the printing start sheet in vicarious printing is within the range in which halfway printing is not permitted. In this example, the recovery printing start page is the third page and the range in which halfway printing is not permitted is set from the first sheet to the fifth sheet.

If sheets have been prepared by assuming that the designated printing method (901 in FIG. 9) is double-sided printing, it is determined that vicarious printing starts from a point within the range in which halfway printing is not permitted, since the third page corresponding to the front page on the second sheet. If it is determined that the start point of vicarious printing is within the range in which halfway printing is not permitted (YES in S705), then the process advances to step S706 and printing range determination processing is performed. In this step, a range in which printing is actually performed is determined. In this example, the range from the first sheet to the final sheet for the document is set as a printing range.

Thereafter, the process advances to step S707 and printing processing is executed. Thus, halfway printing can be controlled by processing performed by the printing control application 304 and the printing application 305.

In this embodiment, in a case where a printing range is designated on a page-by-page basis at the time of printing with respect to output contents prescribed according to an intention in printing control before saving of printing data to the spooler, printing control reflecting the desired printing contents can be performed.

<Other Embodiments>

The present invention may be applied to a system constituted by a plurality of units (e.g., a host computer, an interface device, a reader, and a printer) or to an apparatus formed of one unit (a copying machine, a printer, or a facsimile machine).

The objects of the present invention can be achieved by performing a process in which a storage medium on which program codes of software for realizing the functions of each of the above-described embodiments is provided and a computer in a system (or CPU or MPU) or in an apparatus of a computer reads out and executes the program codes stored on the storage medium.

In such a case, the program codes themselves, read out from the storage medium, realize the functions of each of the above-described embodiments, and the storage medium having the program codes stored thereon constitute the present invention.

As the storage medium for supplying the program codes, a floppy disk, a hard disk, an optical disc, a magneto-optic disc, a compact disc-read only memory (CD-ROM), compact disc-recordable (CD-R), a magnetic tape, a nonvolatile memory card, a ROM, etc., may be used.

The present invention comprises not only realization of the functions of each of the above-described embodiments by a computer reading out and executing the program codes, but also realization of the functions of each of the above-described embodiments by processing performed by an operating system (OS) or the like running on a computer in such a manner that the OS performs part or the whole of the actual processing on the basis of instructions according to the program codes.

Further, the present invention comprises realization of the functions of each of the above-described embodiments achieved by performing processing in such a manner that program codes read out from a storage medium are written to a memory provided in a function expansion board inserted in a computer or in a function expansion unit connected to the computer, and a CPU provided in the function expansion board or the function expansion unit performs part or the whole of actual processing on the basis of instructions according to the program codes.

As described above, the present invention enables a user to produce and edit a document by combining groups of data formed by application programs selected according to user's need, and to improve the document editing productivity by improving the operability of the system.

The present invention enables information processing for determining an allowable printing range on the basis of a printing range of a document and print settings.

Further, the present invention ensures that in a case where a printing range is designated at the time of printing with respect to output contents prescribed according to an intention in printing control before saving of printing data to the spooler, printing control reflecting the desired printing contents can be performed.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus which produces printing data to be printed by a printer, comprising:
    an acceptance unit adapted to accept a printing range of a document designated when printing of the document is performed;
    a decision unit adapted to make a decision about permission of printing processing in the designated printing range on the basis of the designated printing range and print settings made for the document; and
    a printing range determination unit adapted to determine a printing range in which printing processing is permitted according to the result of the decision made by said decision unit;
    a setting changing unit adapted to change the print settings made for the document; and
    a non-permission range setting unit adapted to set a range in which halfway printing is not permitted in accordance with the print settings changed by said setting changing unit,
    wherein in a case where a print unit from which recovery printing is started is included in the range in which the halfway printing is not permitted, said printing range determination unit determines a start of the recovery printing at a first print unit in the range in which the halfway printing is not permitted.

2. The information processing apparatus according to claim 1, further comprising:
    a save control unit adapted to save and control the changed data as an effective print setting on the basis of a saving instruction from said setting changing unit,
    wherein said printing range determination unit produces printing data in the printing range on the basis of the print setting saved by said save control unit or the unsaved print setting changed and controlled by said setting changing unit.

3. The information processing apparatus according to claim 2, wherein said setting changing unit changes with respect to the print unit a print setting made for said document, and/or adds control data for controlling printing with respect to the print unit.

4. The information processing apparatus according to claim 1, wherein said printing range determination unit produces printing data with respect to the print unit on the basis of a print designation and according to the print settings.

5. The information processing apparatus according to claim 2, wherein if a print setting for designating recovery printing is made by said setting changing unit, said save control unit updates and stores the print setting according to a save instruction from said setting changing unit.

6. The information processing apparatus according to claim 2, wherein if a print setting made by said setting changing unit is a setting for recovery printing, said printing range determination unit determines a printing range from which recovery printing is started, and produces printing data corresponding to the printing range.

7. An information processing apparatus which produces printing data to be printed by a printer, comprising:

an acceptance unit adapted to accept a printing range of a document designated when printing of the document is performed;

a decision unit adapted to make a decision about permission of printing processing in the designated printing range on the basis of the designated printing range and print settings made for the document; and a printing range determination unit adapted to determine a printing range in which printing processing is permitted according to the result of the decision made by said decision unit;

a setting changing unit adapted to change and control a print setting made for the document when printing of the document is performed; and a save control unit adapted to save and control the changed data as an effective print setting on the basis of a save instruction from said setting changing unit, wherein said printing range determination unit produces printing data in the printing range on the basis of the print setting saved by said save control unit or the unsaved print setting changed and controlled by said setting changing unit, and said setting changing unit changes with respect to a print unit a print setting made for the document, and/or adds control data for controlling printing with respect to the print unit, and the print unit is data issued with respect to printing of the document, and this data has a data structure such that a minimum unit corresponds to an original page.

8. An information processing method in which printing data to be printed by a printer is produced, said method comprising:

an acceptance step of accepting a printing range of a document designated when printing of the document is performed;

a decision step of making a decision about permission of printing processing in the designate printing range on the basis of the designated printing range and print settings made for the document; and a printing range determination step of determining a printing range in which printing processing is permitted according to the result of decision made in said decision step;

a setting changing step of changing the print settings made for the document; and a non-permission range setting step of setting a range in which halfway printing is not permitted in accordance with the print settings changed in said setting changing step, wherein in a case where a print unit from which recovery printing is started is included in the range in which the halfway printing is not permitted, said printing range determination step includes determining a start of the recovery printing at a first print unit in the range in which the halfway printing is not permitted.

9. The information processing method according to claim 8, further comprising:

a save control step of saving and controlling changed data as an effective print setting on the basis of a saving instruction issued in said setting changing step, wherein said printing range determination step includes producing printing data in the printing range on the basis of the print setting saved into a memory by processing in said save control step or the unsaved print setting changed and controlled in said setting changing step.

10. The information processing method according to claim 9, wherein said setting changing step includes changing with respect to the print unit a print setting made for said document, and/or adding control data for controlling printing with respect to the print unit.

11. The information processing method according to claim 8, wherein said printing range determination step includes producing printing data with respect to the print unit on the basis of a print designation and according to the print settings.

12. The information processing method according to claim 9, wherein if a print setting for designating recovery printing is made in said setting changing step, said save control step includes updating and storing into a memory the print setting according to a save instruction issued in said setting changing step.

13. The information processing method according to claim 9, wherein if a print setting made in said setting changing step is a setting for recovery printing, said printing range determination step includes determining a printing range from which recovery printing is started, and producing printing data corresponding to the printing range.

14. An information processing method in which printing data to be printed by a printer is produced, said method comprising:

an acceptance step of accepting a printing range of a document designated when printing of the document is performed;

a decision step of making a decision about permission of printing processing in the designated printing range on the basis of the designated printing range and print settings made for the document; and a printing range determination step of determining a printing range in which printing processing is permitted according to the result of the decision made in said decision step;

a setting changing step of changing and controlling a print setting made for the document when printing of the document is performed; and a save control step of saving and controlling changed data as an effective print setting on the basis of a saving instruction issued in said setting changing step, wherein said printing range determination step includes producing printing data in the printing range on the basis of the print setting saved into a memory by processing in said save control step or the unsaved print setting changed and controlled in said setting changing step, and said setting changing step includes changing with respect to a print unit a print setting made for the document, and/or adding control data for controlling printing with respect to the print unit, and the print unit is data issued with respect to printing of the document, and this data has a data structure such that a minimum unit corresponds to an original page.

15. A program embodied in a computer readable medium for enabling a computer to execute an information processing method in which printing data to be printed by a printer is produced, said program making the computer execute:

an acceptance module for accepting a printing range of a document designated when printing of the document is performed;

a decision module for making a decision about permission of printing processing in the designated printing range on the basis of the designated printing range and print settings made for the document; and a printing range determination module for determining a printing range in which printing processing is permitted according to the result of the decision made in said decision module;

a setting changing module for changing the print settings made for the document; and a non-permission range setting module for setting a range in which halfway printing is not permitted in accordance with the print settings changed by said setting changing module, wherein in a case where a print unit from which recovery printing is started is included in the range in which the halfway printing is not permitted, said printing range determination module determines a start of the recovery printing at a first print unit in the range in which the halfway printing is not permitted.

16. A storage medium on which there is stored program for enabling a computer to execute an information processing method in which printing data to be printed by a printer is produced, said storage medium comprising:

an acceptance module for accepting a printing range of a document designated when printing of the document is performed;

a decision module for making a decision about permission of printing processing in the designated printing range on the basis of the designated printing range and print settings made for the document; and a printing range determination module for determining a printing range in which printing processing is permitted according to the result of the decision made in said decision module;

a setting changing module for changing the print settings made for the document; and a non-permission range setting module for setting a range in which halfway printing is not permitted in accordance with the print settings changed by said setting changing module, wherein in a case where a print unit from which recovery printing is started is included in the range in which the halfway printing is not permitted, said printing range determination module determines a start of the recovery printing at a first print unit in the range in which the halfway printing is not permitted.

* * * * *

UNITED STATES PATENT AND TRADEMARK OFFICE
CERTIFICATE OF CORRECTION

| | | |
|---|---|---|
| PATENT NO. | : 7,145,687 B2 | |
| APPLICATION NO. | : 10/238740 | |
| DATED | : December 5, 2006 | |
| INVENTOR(S) | : Satoshi Nishikawa et al. | |

It is certified that error appears in the above-identified patent and that said Letters Patent is hereby corrected as shown below:

SHEET 9:

Figure 9, "ONCE" should read --ONE--.

SHEET 16:

Figure A, "DESIGNABLE" (three occurrences) should read --DESIGNATABLE-- and "DESIGNABLE." should read --DESIGNATABLE.--.

SHEET 17:

Figure B, "DESIGNABLE" (two occurrences) should read --DESIGNATABLE-- and "NON-DESIGNABLE." (two occurrences) should read --NON-DESIGNATABLE.--.

SHEET 18:

Figure 17, "DESIGNABLE" should read --DESIGNATABLE--, "DESIGNABLE." should read --DESIGNATABLE.--, and "STABLING" should read --STAPLING--.

SHEET 19:

Figure 18, "DESIGNABLE" should read --DESIGNATABLE-- and "PATERNS" should read --PATTERNS--.

COLUMN 1:

Line 35, "Office sweet" should read --office suite--;
Line 55, "drier" should read --driver--; and
Line 66, "application" should read --applications--.

COLUMN 2:

Line 6, "is" should read --are--; and
Line 36, "respect editing," should read --respect to editing,--.

UNITED STATES PATENT AND TRADEMARK OFFICE
CERTIFICATE OF CORRECTION

| | |
|---|---|
| PATENT NO. | : 7,145,687 B2 |
| APPLICATION NO. | : 10/238740 |
| DATED | : December 5, 2006 |
| INVENTOR(S) | : Satoshi Nishikawa et al. |

It is certified that error appears in the above-identified patent and that said Letters Patent is hereby corrected as shown below:

COLUMN 3:

Line 5, "its" should be deleted.

COLUMN 4:

Line 26, "the" (second occurrence) should be deleted; and
Line 59, "According still" should read --According to still--.

COLUMN 5:

Line 61, "standalone" should read --stand-alone--.

COLUMN 9:

Line 66, "there is" should be deleted.

COLUMN 10:

Line 24, "Nup" should read --N-up--;
Line 35, "designable" should read --designatable--;
Line 36, "designable" should read --designatable--;
Line 38, "designable" should read --designatable--; and
Line 40, "designable" should read --designatable--.

COLUMN 11:

Line 27, "drug" should read --drag--; and
Line 64, "Nup" should read --N-up--.

COLUMN 13:

Line 30, "standalone" should read --stand-alone--; and
Line 41, "standalone" should read --stand-alone--.

COLUMN 14:

Line 23, "standalone" should read --stand-alone--.

UNITED STATES PATENT AND TRADEMARK OFFICE
CERTIFICATE OF CORRECTION

PATENT NO. : 7,145,687 B2
APPLICATION NO. : 10/238740
DATED : December 5, 2006
INVENTOR(S) : Satoshi Nishikawa et al.

It is certified that error appears in the above-identified patent and that said Letters Patent is hereby corrected as shown below:

COLUMN 16:

Line 62, "with reach other" should read --with each other--.

COLUMN 17:

Line 22, "coverts" should read --converts--.

COLUMN 19:

Line 4, "transferred the" should read --transferred by the--.

COLUMN 20:

Line 2, "two-side" should read --two-sided--.

COLUMN 21:

Line 43, "Nup" should read --N-up--.

COLUMN 24:

Line 67, "corresponding" should read --corresponds--.

COLUMN 26:

Line 24, "and" should be deleted.

COLUMN 27:

Line 13, "and" should be deleted;
Line 43, "designate" should read --designated--;
Line 45, "and" should be deleted; and
Line 48, "of decision" should read --of the decision--.

COLUMN 28:

Line 38, "and" should be deleted.

UNITED STATES PATENT AND TRADEMARK OFFICE
CERTIFICATE OF CORRECTION

PATENT NO. : 7,145,687 B2
APPLICATION NO. : 10/238740
DATED : December 5, 2006
INVENTOR(S) : Satoshi Nishikawa et al.

It is certified that error appears in the above-identified patent and that said Letters Patent is hereby corrected as shown below:

COLUMN 29:

Line 7, "and" should be deleted; and
Line 24, "stored program" should read --stored a program--.

COLUMN 30:

Line 7, "and" should be deleted.

Signed and Sealed this

Twenty-seventh Day of May, 2008

JON W. DUDAS
*Director of the United States Patent and Trademark Office*